US012268947B2

(12) United States Patent
Sato

(10) Patent No.: US 12,268,947 B2
(45) Date of Patent: Apr. 8, 2025

(54) EXERCISE EQUIPMENT

(71) Applicant: VIRTUALWINDOW CO., LTD., Tokyo (JP)

(72) Inventor: Rui Sato, Tokyo (JP)

(73) Assignee: VIRTUALWINDOW CO., LTD., Tokyo (JP)

( * ) Notice: Subject to any disclaimer, the term of this patent is extended or adjusted under 35 U.S.C. 154(b) by 376 days.

(21) Appl. No.: 17/604,687

(22) PCT Filed: Apr. 22, 2020

(86) PCT No.: PCT/JP2020/017381
§ 371 (c)(1),
(2) Date: Oct. 18, 2021

(87) PCT Pub. No.: WO2020/218368
PCT Pub. Date: Oct. 29, 2020

(65) Prior Publication Data
US 2022/0203206 A1    Jun. 30, 2022

(30) Foreign Application Priority Data

Apr. 26, 2019  (JP) .................................. 2019-085104

(51) Int. Cl.
*A63B 71/06* (2006.01)
*A63B 22/06* (2006.01)
(Continued)

(52) U.S. Cl.
CPC ............ *A63B 71/0622* (2013.01); *G06T 7/50* (2017.01); *G06T 7/74* (2017.01); *H04N 13/344* (2018.05);
(Continued)

(58) Field of Classification Search
None
See application file for complete search history.

(56) References Cited

U.S. PATENT DOCUMENTS 9,201,499 B1   12/2015   Chang et al.
9,204,121 B1   12/2015   Marason et al.
(Continued)

FOREIGN PATENT DOCUMENTS

JP          S6125577 A      2/1986
JP       2000-296185 A     10/2000
(Continued)

OTHER PUBLICATIONS

Jul. 25, 2023 Office Action Issued in Japanese Patent Application No. 2022-066835.
(Continued)

*Primary Examiner* — Ryan M Gray
(74) *Attorney, Agent, or Firm* — Oliff PLC

(57) ABSTRACT

An objective of the present invention is to provide exercise equipment which can provide a user with an immersive experience that allows the user to feel like they are there, while reducing unease or discomfort on the part of the user. The exercise equipment comprises: an exercise device for allowing a user to carry out a prescribed exercise; a measurement device which measures a viewpoint position of the user in a prescribed reference coordinate system when the user carries out the exercise using the exercise device; and a video device which generates and displays a display image of an object in a virtual space of the reference coordinate system on a fixed screen according to the viewpoint position, the display image simulating how the object would appear when viewed from the viewpoint position through the screen.

17 Claims, 14 Drawing Sheets

(51) Int. Cl.
*G06T 7/50* (2017.01)
*G06T 7/73* (2017.01)
*H04N 13/344* (2018.01)
*H04N 13/366* (2018.01)

(52) U.S. Cl.
CPC ............ *H04N 13/366* (2018.05); *A63B 22/06* (2013.01); *A63B 2071/0636* (2013.01); *A63B 2071/0644* (2013.01); *A63B 2220/05* (2013.01); *H04N 2213/002* (2013.01)

(56) References Cited

U.S. PATENT DOCUMENTS

| | | | |
|---|---|---|---|
| 10,156,900 | B2 | 12/2018 | Publicover et al. |
| 10,231,662 | B1* | 3/2019 | Berme ................. G06F 3/0334 |
| 10,839,607 | B2* | 11/2020 | Baumbach ............ G02B 30/10 |
| 2003/0064860 | A1 | 4/2003 | Yamashita et al. |
| 2008/0102424 | A1* | 5/2008 | Holljes .............. A63B 21/4034 434/247 |
| 2011/0034300 | A1 | 2/2011 | Hall |
| 2011/0177914 | A1* | 7/2011 | Park ................... A63B 71/0622 482/54 |
| 2013/0190135 | A1 | 7/2013 | Pryor |
| 2015/0154452 | A1* | 6/2015 | Bentley ................ G11B 27/022 386/201 |
| 2017/0290504 | A1 | 10/2017 | Khaderi et al. |
| 2018/0356636 | A1* | 12/2018 | Kimura ................ G02B 27/017 |
| 2019/0066630 | A1* | 2/2019 | Fukazawa ................ G09G 5/36 |
| 2019/0289285 | A1* | 9/2019 | Nashida ............. H04N 13/366 |
| 2020/0254300 | A1* | 8/2020 | Khilmanovich ... A63B 22/0023 |

FOREIGN PATENT DOCUMENTS

| | | | |
|---|---|---|---|
| JP | 2003102868 | A | 4/2003 |
| JP | 2011-097988 | A | 5/2011 |
| JP | 2017-064120 | A | 4/2017 |
| JP | 2017-120550 | A | 7/2017 |
| JP | 2017-526078 | A | 9/2017 |
| JP | 2018-056924 | A | 4/2018 |
| WO | 2017/177187 | A1 | 10/2017 |
| WO | 2018/100800 | A1 | 6/2018 |

OTHER PUBLICATIONS

Jun. 30, 2020 International Search Report issued in International Patent Application No. PCT/JP2020/017381.
Oct. 22, 2020 International Preliminary Report on Patentability issued in International Patent Application No. PCT/JP2020/017381.
"The Trip (registered trademark)", LesMILLS (registered trademark), [online], [Retrieved on Mar. 19, 2019], Internet <URL: https://www.lesmills.com/workouts/fitness-classes/the-trip/>.
"Icaros Pro (Icaros is a registered trademark)", Icaros GmbH, [online], [Retrieved on Mar. 19, 2019], Internet <URL: https://www.icaros.com/en/products/icaros-pro/>.
"HOLOFIT (registered trademark)", Fun and Body, [online], [Retrieved on Mar. 19, 2019], Internet <URL: https://www.funandbody.com/wp-content/uploads/2017/07/05a3b4350d60984d4ba358da5d52b3ee.pdf>.
VirZoom, "VirZoom", [online], [Retrieved on Mar. 19, 2019], Internet <URL: https://www.virzoom.com/>.
Sony Corporation, "Immersive space entertainment music visualizer & cyber gym", Sony Design, [online], May 19, 2017 [retrieved on Jun. 4, 2020], Retrieved from the Internet: <URL: https://www.sony.co.jp/SonyInfo/design/stories/immersivespace/>, pp. 1-9.
Dec. 14, 2022 Extended European Search Report Issued in European Patent Application No. 20796345.5.
Nov. 12, 2024 Office Action issued in Japanese Patent Application No. 2023-201260.
Feb. 18, 2025 Office Action issued in Japanese Patent Application No. 2023-201260.

* cited by examiner

EXERCISE EQUIPMENT

TECHNICAL FIELD

The present invention relates to a technology of simultaneously providing a video and an exercise experience.

BACKGROUND ART

Each of PTL 1 and PTL 2 discloses exercise equipment including a combination of an exercise machine and a video device.

In recent years, exercise equipment that provides an enhanced sense of realism has been proposed. NPL 1 proposes exercise equipment that uses a large-size display to provide a video and improve a video experience during exercising. Meanwhile, each of NPL 2 to NPL 4 proposes exercise equipment that uses a head-mounted display to provide a video and improve a video experience during exercising.

CITATION LIST

Patent Literatures

[PTL 1]
 Japanese Patent Application Publication No. 2000-296185
[PTL 2]
 Japanese Patent Application Publication No. 2011-97988

Non Patent Literatures

[NPL 1]
 "THE TRIP (registered trademark)", LesMILLS (registered trademark), [online], [Retrieved on Mar. 19, 2019], Internet <URL: https://www.lesmills.com/workouts/fitness-classes/the-trip/>
[NPL 2]
 "ICAROS PRO (ICAROS is a registered trademark)", ICAROS GmbH, [online], [Retrieved on Mar. 19, 2019], Internet <URL: https://www.icaros.com/en/products/icaros-pro/>
[NPL 3]
 "HOLOFIT (registered trademark)", FUN AND BODY, [online], [Retrieved on Mar. 19, 2019], Internet <URL: https//www.funandbody.com/wp-content/uploads/2017/07/05a3b4350d60984d4ba358da5d52b3ee.pdf>
[NPL 4]
 VirZoom, "VirZOOM", [online], [Retrieved on Mar. 19, 2019], Internet <URL: https://www.virzoom.com/>

SUMMARY OF INVENTION

Technical Problem

With the exercise equipment disclosed in NPL 1, a user performs an exercise, while viewing a video displayed on the large-size display. From the large-size display, an effect of enhancing a sense of realism and a sense of immersion can be expected to a degree. However, even when a body of the user moves as a result of the exercise using an exercise machine, the video displayed on the large-size display does not follow the movement. Accordingly, it cannot be said that the user can feel an intense sense of realism and an intense sense of immersion as if the user were actually in the world in the video.

With the exercise equipment disclosed in NPL 2 to NPL 4, a user performs an exercise, while viewing the video displayed on the head-mounted display. On the head-mounted display, a virtual reality video that can be viewed from a viewpoint of the user is displayed, and accordingly an intense sense of reality and an intense sense of immersion can be expected.

However, since the head-mounted display is in intimate contact with the forehead of the user, a problem arises in that the user may feel uncomfortable when he or she sweats from performing the exercise. Another problem also arises in that, due to fogging of a screen of the head-mounted display by sweat, the user may not be able to view the video. Still another problem also arises in that hair of the user caught between the head-mounted display and the face of the user may give a feeling of discomfort to the user. Yet another problem also arises in that the weight of the head-mounted display may interrupt the exercise. Still another problem also arises in that the exercise performed by the user may move the head-mounted display out of place.

Additionally, in a state where the user is wearing the head-mounted display, the user has no idea about his or her footing and a surrounding situation, and may consequently feel uneasy. Furthermore, in a situation where the user has no idea about his or her footing and surroundings, the user may be forced to take care of physical balance.

An object of this disclosure is to provide exercise equipment capable of reducing a sense of uneasiness or discomfort felt by a user, while providing the user with an intense sense of reality and an intense sense of immersion.

Solution to Problem

Exercise equipment according to an aspect of this disclosure includes: an exercise device for causing a user to perform a predetermined exercise; a measurement device configured to measure a viewpoint position of the user in a predetermined reference coordinate system when the user performs the exercise by using the exercise device; and a video device configured to generate, based on the viewpoint position, a display video of an object in a virtual space in the reference coordinate system which simulates how the object appears when the object is viewed from the viewpoint position via a fixed viewing surface, and display the display video on the viewing surface.

Advantageous Effects of Invention

It is possible to reduce a sense of uneasiness or discomfort felt by a user, while providing the user with an intense sense of reality and an intense sense of immersion.

DESCRIPTION OF EMBODIMENTS

The following will describe embodiments of the present invention with reference to the drawings.

Embodiment 1

Figure 1:
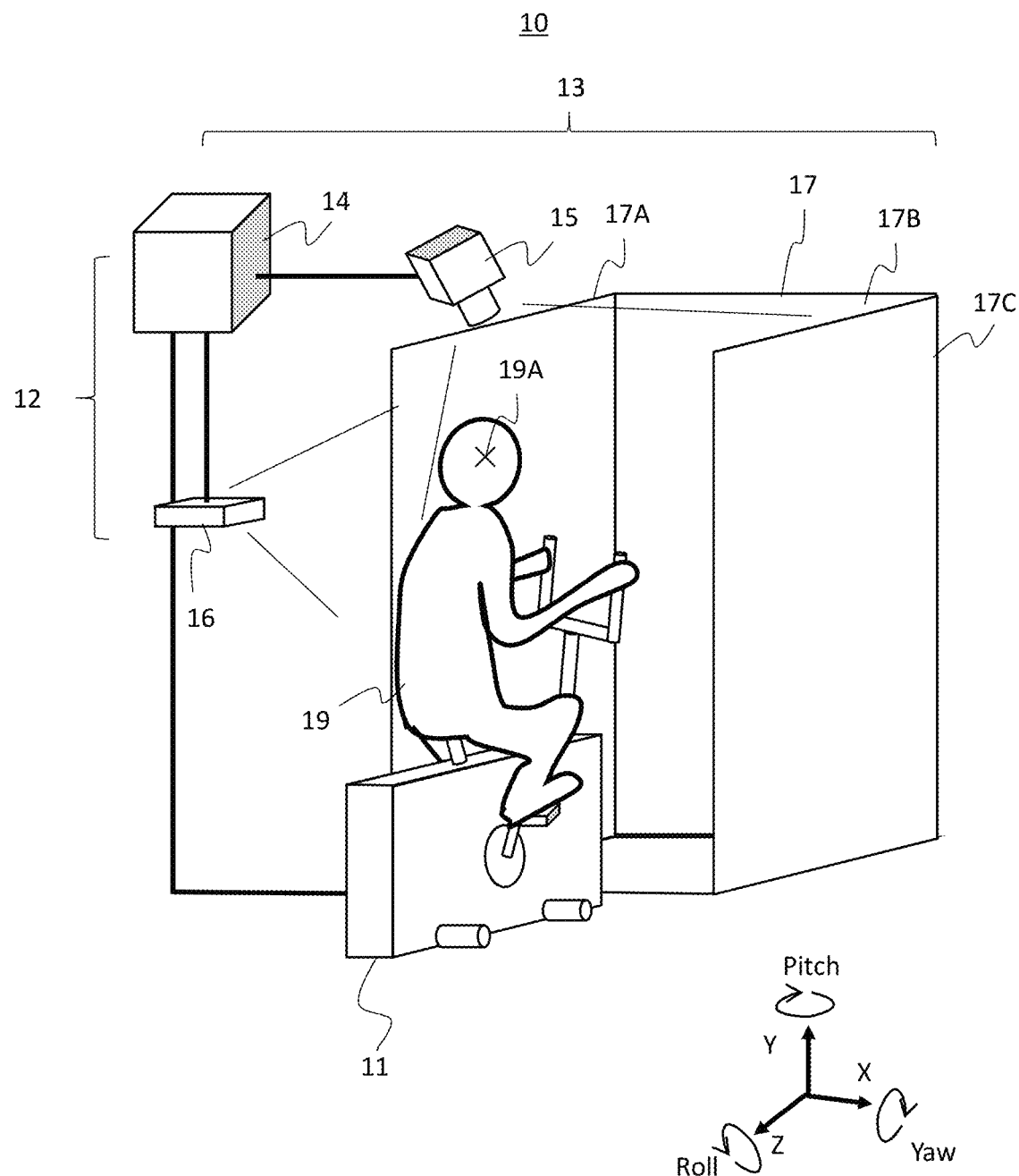
FIG. 1 is a schematic configuration diagram of exercise equipment according to Embodiment 1.

FIG. 1 is a schematic configuration diagram of exercise equipment according to Embodiment 1. Exercise equipment 10 includes an exercise device 11, a measurement device 12, and a video device 13. The measurement device 12 is implemented by an information processing device 14 and a sensor 16. The video device 13 is implemented by the information processing device 14, a projection device 15, and a screen 17. The screen 17 includes three screens 17A, 17B, and 17C. The information processing device 14 is a computer that uses a processor to execute a software program, and is shared by the measurement device 12 and the video device 13.

The exercise device 11 is an exercise device for allowing a user 19 to perform a predetermined exercise. In Embodiment 1, the exercise device 11 is a fitness bike for causing the user 19 to perform a cycling exercise.

The measurement device 12 measures, when the user 19 performs the exercise by using the exercise device 11, a viewpoint position 19A of the user 19 in a predetermined reference coordinate system. The viewpoint position 19A is a position equivalent to eye positions. The specific viewpoint position 19A to be used for processing is not particularly limited and, for example, a middle point between both eyes, a center point in a head region, a position inside the head region at a predetermined distance from each of respective centers of both of the eyes, or the like can be used as the viewpoint position 19A.

FIG. 1 illustrates, as an example of the reference coordinate system, a rectangular coordinate system having an X-axis extending rightward from the user 19, a Y-axis extending upward from the user 19, and a Z-axis extending rearward from the user 19. The projection device 15, the sensor 16, and the screen 17 have respective positions and postures which are fixed in the reference coordinate system. Each of the postures is represented by Yaw in a direction around the X-axis, Pitch in a direction around the Y-axis, and Roll in a direction around the Z-axis.

The video device 13 generates, based on the viewpoint position 19A, a display video of an object in a virtual space in the reference coordinate system which simulates how the object appears when the object is viewed from the viewpoint position 19A via a fixed viewing surface, and displays the display video on the viewing surface. In Embodiment 1, the viewing surface fixed in the reference coordinate system is a viewing surface of the screen 17. Since the screen 17 includes the three screens 17A, 17B, and 17C, the video device 13 displays, on each of viewing surfaces of the screens 17A, 17B, and 17C, the display video of the object in the virtual space which is viewable from the viewpoint position 19A via each of the viewing surfaces. For example, the video device 13 preliminarily stores, as an original video, a three-dimensional video representing a three-dimensional object in the virtual space in an internal storage device, and generates the display video from the three-dimensional video by such processing as to allow the three-dimensional object in the virtual space to seem to the user 19 to be a concrete and natural image so as to give the illusion to the user 19 that the three-dimensional object is actually there. At that time, when generating an image to be displayed on the viewing surface of, e.g., the screen 17A, the video device 13 performs projection transform by which the three-dimensional object in the virtual space, which is defined in three-dimensional data, is projected on the viewing surface of the screen 17A, i.e., a two-dimensional plane. For the screens 17B and 17C also, the video device 13 generates the display video by the same processing.

Thus, according to Embodiment 1, the video based on the viewpoint position 19A of the user 19 is displayed on the screen 17, and therefore it is possible to provide the user 19 with an intense sense of realism and an intense sense of immersion each resulting from integration between the exercise and the video. In addition, Embodiment 1 uses a method of displaying the video not on a head-mounted display, but on the fixed viewing surface, and consequently keeps the user 19 from feeling such a sense of uneasiness or discomfort as felt when the user 19 exercises, while wearing a head-mounted display.

Note that, in the example shown herein, the video device 13 generates the display video by using the three-dimensional video as the original video, but the original video may also be a two-dimensional video. An example of processing of generating, based on the two-dimensional video, a display video to be displayed on the viewing surface of the screen 17 will be described later.

Also, as an example of the exercise device 11, the fitness bike is illustrated, but the exercise device 11 may also be another exercise device. Other examples of the exercise device 11 include a treadmill for causing the user 19 to perform a running and/or walking exercise, a rowing machine for causing the user 19 to perform a rowing exercise, a horse riding exercise machine for causing the user 19 to perform a horse riding exercise, a cross-trainer for causing the user 19 to perform a combined arm/leg exercise, a stair-climber for causing the user to 19 to perform a stair-climbing exercise, and the like.

As an example of the fixed viewing surface, not a viewing surface which moves with the head region of the user such as a head-mounted display, but the viewing surface of the screen 17 is shown herein. While the example in which the video is projected from the projection device 15 on the viewing surface of the screen 17 is shown, the video device 13 may also have another configuration. In another example, a display device such as a liquid crystal display or an organic EL (Electro-Luminescence) display may also be used instead of the projection device 15 and the screen 17. The following will more specifically describe the exercise equipment 10 in Embodiment 1.

The measurement device 12 continuously measures the viewpoint position 19A, and the video device 13 generates the display video in such a manner as to follow the viewpoint position 19A and displays the display video on the viewing surface of the screen 17. As a result, when the head region moves as the user 19 exercises, the video changes following the viewpoint position 19A that moves with the movement of the head region, and therefore it is possible to give, to the user 19, an intense sense of realism and a sense of immersion each resulting from integration between the exercise and the video. Following the viewpoint position 19A is generating an image representing how what is to be rendered viewed from the viewpoint position 19A appears at that time and performing rendering.

Figure 2:
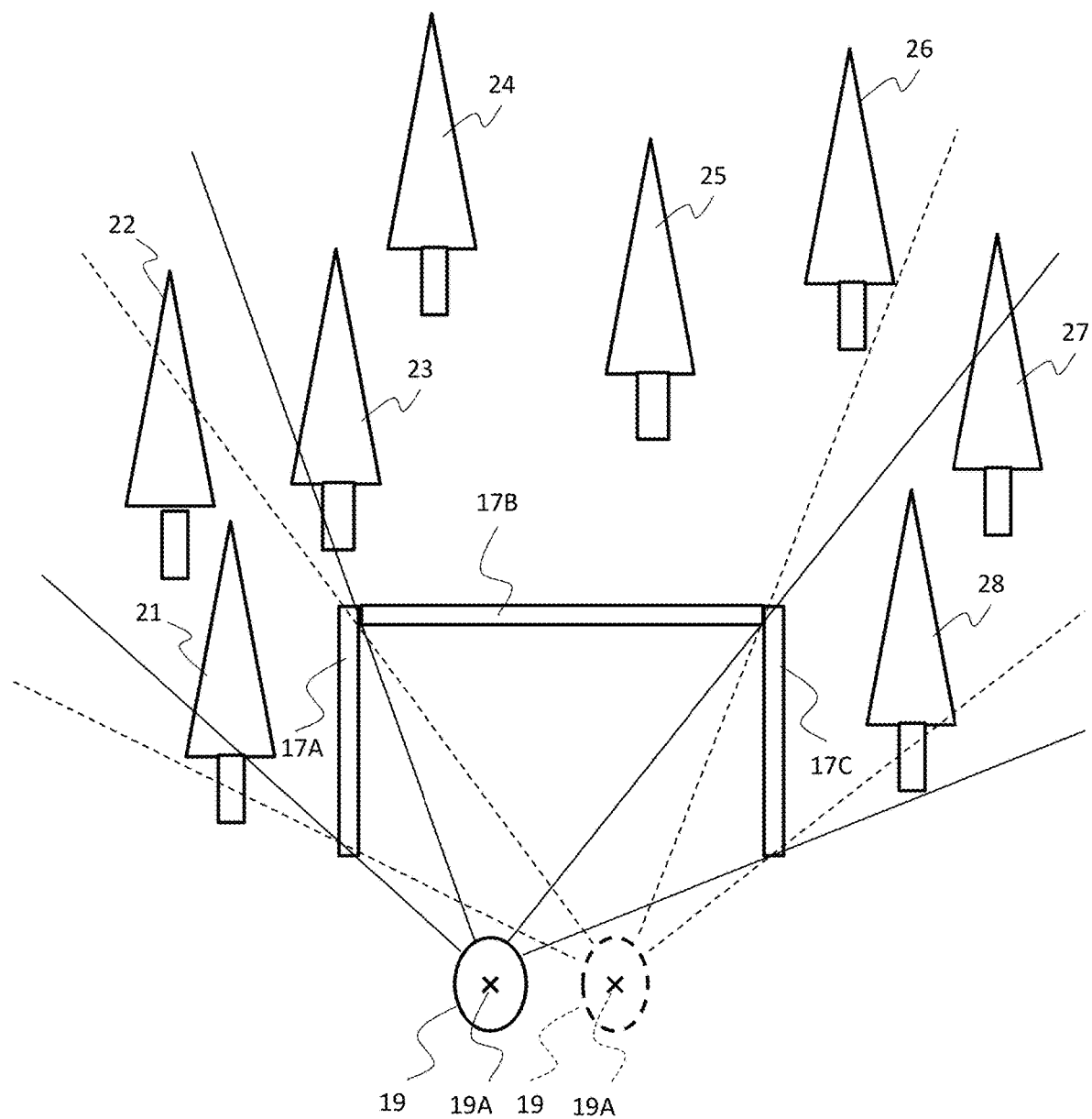
FIG. 2 is a conceptual view for illustrating a display video following a viewpoint position.

FIG. 2 is a conceptual view for illustrating the display video following the viewpoint position. This is a conceptual view obtained by viewing the exercise equipment 10 from above. Objects 21 to 28 are virtual objects each placed in the reference coordinate system to be displayed as the display video on the screens 17A to 17C. It is assumed that, as a result of the cycling exercise performed by the user 19, the viewpoint position 19A moves leftward and rightward as indicated by solid lines and broken lines in FIG. 2. When the viewpoint position 19A moves as illustrated in FIG. 2, images to be displayed on the viewing surfaces of the screens 17A, 17B, and 17C vary. For example, when the viewpoint position 19A is on a left side (solid line), the entire object 22 is displayed on the screen 17A while, when the viewpoint position 19A is on a right side (broken line), the object 22 is displayed extensively over the screen 17A and the screen 17B.

The measurement device 12 in Embodiment 1 has a configuration including an imaging unit that images an area including the head region of the user 19 and a calculation unit that determines the viewpoint position 19A based on a position of the head region of the user 19 imaged by the imaging unit. The imaging unit is implemented by the sensor 16 illustrated in FIG. 1. The calculation unit is implemented by the information processing device 14 illustrated in FIG. 1.

In Embodiment 1, the sensor 16 (imaging unit) is a depth sensor that measures a depth of an object (which is a human body of the user 19 herein) from the sensor 16 at each of pixels. The calculation unit implemented by the information processing device 14 estimates a shape of the human body based on the depth at each of the pixels measured by the sensor 16, and calculates the viewpoint position 19A based on the position of the head region in the human body. Thus, the human body shape is estimated from the depth at each of the pixels and the position of the head region in the human body shape is used, and therefore, even when a position and an orientation of the body of the user 19 variously changes due to the exercise, it is possible to specify the viewpoint position with high accuracy.

Figure 3:
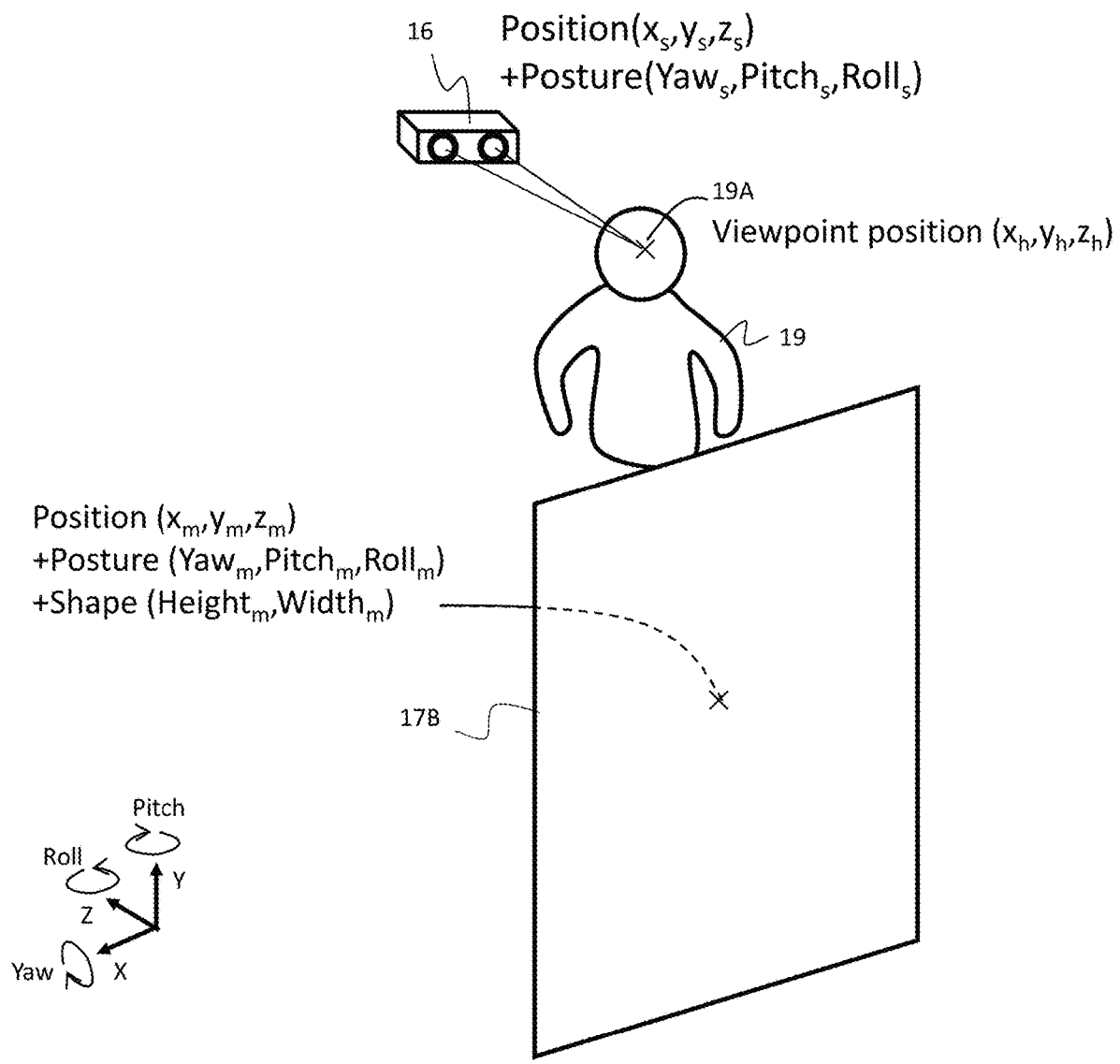
FIG. 3 is a conceptual view for illustrating calculation of the viewpoint position.

FIG. 3 is a conceptual view for illustrating calculation of the viewpoint position. A position $(X_s, Y_s, Z_s)$ of the sensor 16 in the reference coordinate system and the posture $(Yaw_s, Pitch_s, Roll_s)$ thereof are set in advance. From the depth at each of the pixels acquired by the sensor 16 and from the position and posture of the sensor 16, coordinates $(x_h, y_h, z_h)$ of the viewpoint position 19A can be calculated. Note that, as illustrated in FIG. 3, a position $(x_m, y_m, z_m)$, a posture $(Yaw_m, Pitch_m, Roll_m)$, and a shape $(Heght_m, Width_m)$ in the reference coordinate system of the screen 17B are also set in advance. Likewise, the positions, the postures, and the shapes in the screens 17A and 17C are also set in advance.

An image sensed by the sensor 16 may be a depth image, or the depth image and a visible image. For example, it may also be possible that the imaging unit includes a sensor that senses the depth image and a camera that senses the visible image, while the calculation unit uses both of the depth image and the visible image to calculate the viewpoint position 19A.

In the example in FIG. 1 and FIG. 3, the example in which the sensor 16 is disposed behind the user 19 is illustrated. However, the sensor 16 may also be disposed at a position in front of the user 19 which does not overlap the screen 17.

It has also been assumed that the calculation unit estimates the shape of the human body based on the depth at each of the pixels acquired by the sensor 16, and calculates the viewpoint position 19A based on the position of the head region in the human body, but another configuration is also possible. By way of example, it may also be possible that the sensor 16 is at a position higher than that of the head region of the user 19, and the calculation unit extracts an area of the head region from the depth at each of the pixels acquired by the sensor 16, calculates the position of the head region based on the position of the area in an image, and calculates the viewpoint position 19A based on the position of the head region. As a result, the imaging device (camera) over the head captures the head region of the user 19 and determines the viewpoint position, and therefore it is possible to determine the viewpoint position even when the user exercises unless the exercise is an exercise which prevents the overhead camera from photographing the head region of the user due to a handstand or the like.

The position at which the sensor 16 is disposed and processing of calculating the viewpoint position 19A can optionally be combined with each other.

In addition, the video device 13 includes the screen 17 spanning a predetermined range including a front side of the user 19 and the projection device 15 (projector) that projects the display video on the screen 17. Thus, the video is displayed using the screen and the projector, and accordingly the equipment can be built to occupy a small installation area in a fitness gym or the like. Note that the front side of the user 19 mentioned herein means a direction fixed in advance as a direction faced by the face of the user 19 when the user 19 is using the exercise device 11, and does not change even when the user 19 moves (the same applies hereinafter). Also, this configuration is exemplary, and another configuration is also possible. In another example, the video device 13 may also have a display device spanning the predetermined range including the front side of the user 19, such as a liquid crystal display or an organic EL display.

Figure 4:
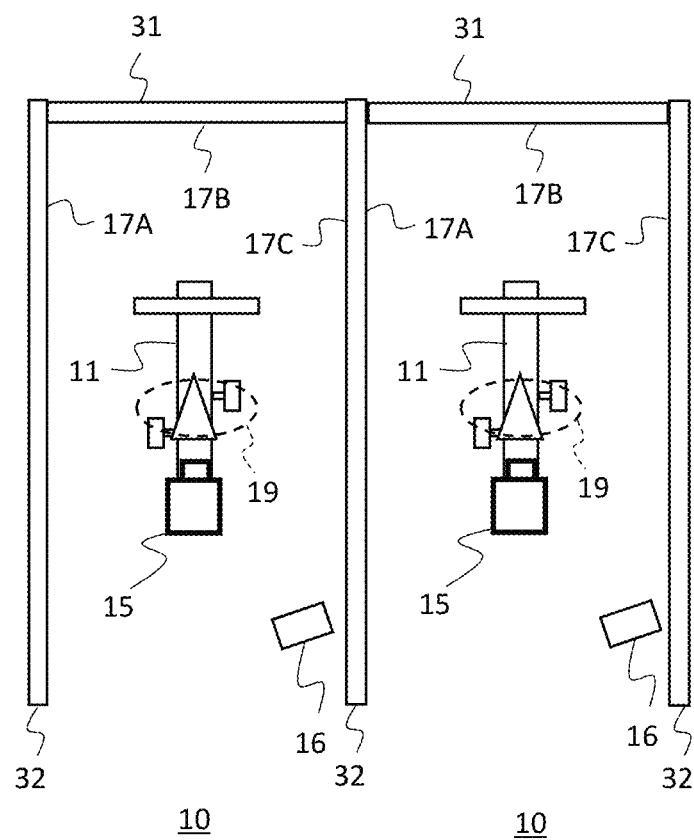
FIG. 4 is a plan view illustrating an example of installation of the exercise equipment.

FIG. 4 is a plan view illustrating an example of installation of the exercise equipment. Referring to FIG. 4, two items of the exercise equipment 10 are installed side by side. Each of the exercise equipment items 10 has a front wall 31 located on the front side of the user 19 and lateral walls 32 in contact with the wall at a 90 degree angle thereto, and is surrounded in three directions by the front wall 31 and the lateral walls 32.

The video device 13 includes the screens 17A to 17C spanning the predetermined range including the front side of the user 19 and the projection device 15 (projector) located at a position higher than that of the head region of the user 19 to project the display video on the screens 17A to 17C, and the front wall 31 and the lateral walls 32 continuously form the screens 17A, 17B, and 17C. Thus, the front wall 31 located on the front side of the user 19 and the lateral walls 32 lateral thereto continuously form the screens 17A to 17C, and consequently it is possible to provide the user 19 with a laterally wide video and give an intense sense of realism and an intense sense of immersion thereto, while inhibiting an increased lateral width of the equipment.

Note that, in the example shown herein, the projection device 15 is disposed at the position higher than that of the head region of the user 19. Specifically, the example is such that the one ultrashort focus projector capable of displaying a video on a large viewing surface even when a distance to the screen is short is disposed at the position higher than that of the head region of the user 19 to project the video on the screens 17A to 17C formed by the front wall 31 and the lateral walls 32. However, another configuration is also possible. For example, it may also be possible to use a configuration in which a real projection projector is used to project the display video from behind the screen. Alternatively, it may also be possible to use a configuration in which the display video is projected from the projector onto the screen via a mirror to improve flexibility of relative positions of the projector and the screen. Also, in the example shown herein, the screen 17 is formed on each of three sides, i.e., the front side and both lateral sides of the user 19, but another configuration is also possible. It may also be possible to form the screen 17 on any one, each of any two, or each of a ceiling, a floor, and a rear side of the user and form the screen 17 on each of four, five, or six sides.

Also, in the example shown herein, the one projector is used, but it may also be possible to use a plurality of projectors. In that case, it may also be possible to use the same number of projectors as that of the planes of the screen. When the three screens 17A to 17C are disposed as in Embodiment 1, three projectors may also be disposed correspondingly to the individual screens. Alternatively, the number of the screens need not be the same as the number of the projectors. For example, a configuration in which two projectors project the display video on the three screens 17A to 17C is also possible. Alternatively, a configuration in which four projectors project the display video on the three screens 17A to 17C is also possible.

In the installation example illustrated in FIG. 4, the two exercise equipment items 10 are juxtaposed in the lateral direction, the two exercise equipment items 10 share the lateral wall 32 therebetween, and both of the surfaces of the lateral wall 32 form the screen 17A of one of the exercise equipment items 10 and the screen 17C of the other exercise equipment item 10. This allows the plurality of exercise equipment items 10 capable of providing the user 19 with a laterally wide video to be efficiently built using a limited installation area.

The fitness bike serving as the exercise device 11 in Embodiment 1 is a device for performing a so-called cycling exercise which simulates movement carried out by performing an exercise, and transmits notification information based on a state of the user 19 and/or a state of the exercise device 11 to the video device 13. The notification information is information related to a movement distance. The information related to the movement distance is information which allows the movement distance and a moving speed to be calculated based on the information. Examples of the information include a pulse signal which is generated every time a pedal is rotated once, a code signal representing a rotation speed of the pedal such as the number of rotations per minute, and the like. By determining that one rotation of the pedal causes movement over a predetermined distance, it is possible to calculate the movement distance from the pulse signal. Then, based on the movement distance and a time period required for the movement, it is possible to calculate the moving speed. In addition, by determining that one rotation of the pedal causes the movement over the predetermined distance, it is possible to calculate the moving speed from the rotation speed of the pedal. Then, based on the moving speed and a time period of the movement, it is possible to calculate the movement distance.

The video device 13 controls the display video based on the notification information received from the exercise device 11. In a specific example, the video device 13 calculates the moving speed from the notification information, and displays a display video in which the user 19 were as if moving at the moving speed in the virtual space. For example, as the moving speed obtained from the notification information is higher, the speed at which the user is moving in the virtual space is higher. This allows the states of the user and/or the exercise device to be reflected in the video and can thus enhance the sense of realism and the sense of immersion.

The display video in which the user 19 were as if moving in the virtual space may be a video in which a background in the virtual space is moved or may also be a video to which a video effect of evoking movement has been given. Alternatively, the display video in which the user 19 were as if moving in the virtual space may also be a video in which the background is moved and to which the video effect of evoking movement has been given. The display video in which the user 19 were as if moving in the virtual space need not be based on the moving speed or the movement distance calculated from the notification information. When there is movement based on the notification information, it may also be possible to display a display video in which the user 19 were as if moving at a preliminarily determined speed in the virtual space.

The video device 13 performs, as control of the display video based on the notification information, stopping of the movement in the virtual space when the user 19 stops exercising or no longer moves. At that time, menu information encouraging a next operation may also be displayed in superimposition on the display video. When receiving predetermined notification information as a result of a predetermined exercise performed by the user 19, the video device 13 may also switch a scene of the display video.

By way of example, the exercise equipment 10 according to Embodiment 1 provides the user 19 with a game.

A description will be given below of a configuration in which the exercise equipment 10 according to Embodiment 1 provides the game and an operation thereof.

The game in Embodiment 1 is a game in which the user uses the exercise device 11 to perform the same exercise as performed by an instructor who cycles on a bike in the video on the screen 17. Specifically, this game is a game using a movement distance and a moving speed resulting from the exercise performed by the user 19. In the game, the user 19 uses the exercise device 11 to perform a cycling exercise so as to cycle at a speed within a predetermined range of a speed at which the instructor in the video cycles on the bike over a predetermined target distance. This game allows the user 19 to naturally perform an effective exercise by performing the cycling exercise so as to follow the instructor in a simulated scene.

Figure 5:
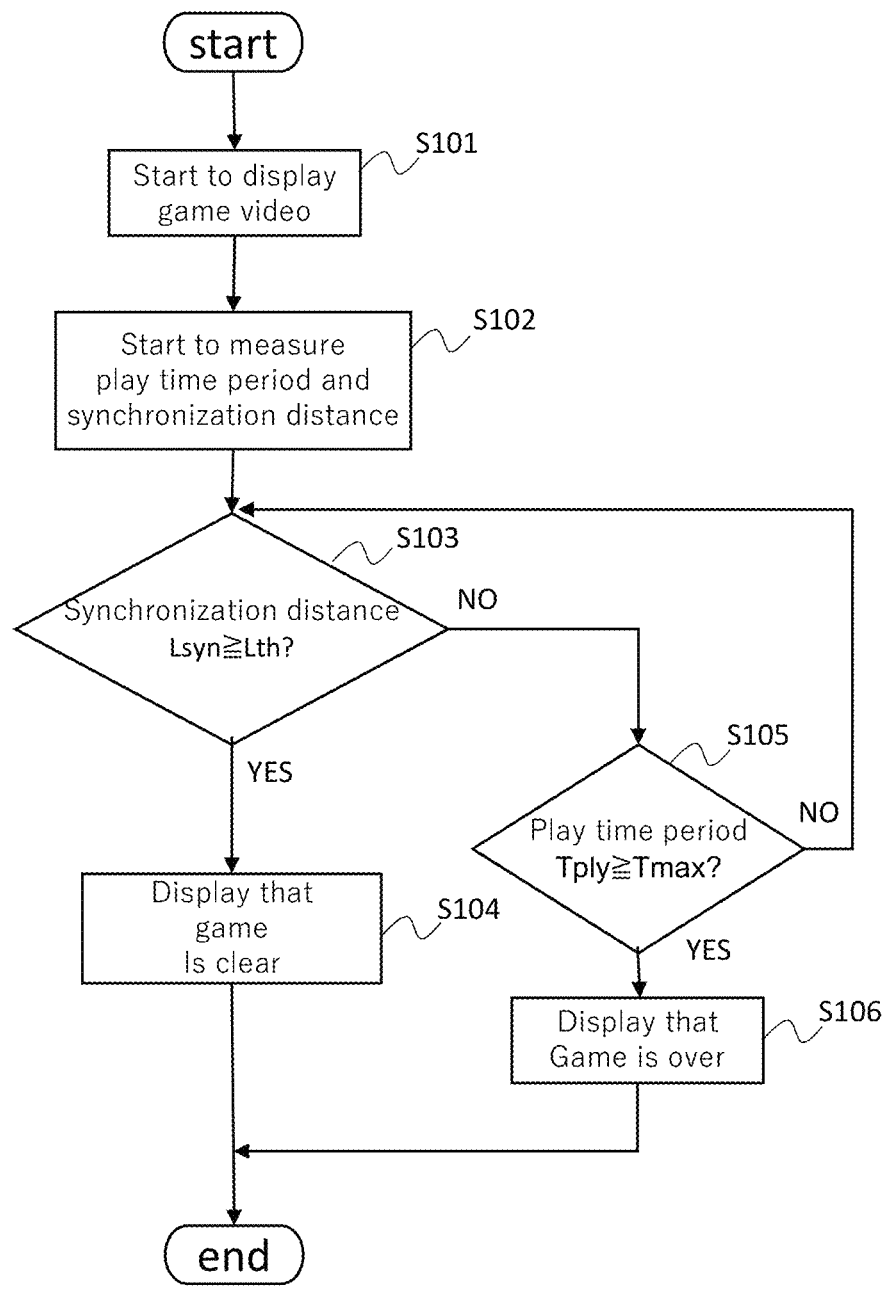
FIG. 5 is a flow chart illustrating processing in an exercise game using the exercise equipment.

FIG. 5 is a flowchart illustrating processing in the exercise game using the exercise equipment.

The video device 13 starts to display a game video at the start of the game (Step S101). The video device 13 continuously displays, on the screen 17, a video of an object which behaves in the simulated scene viewable from the user 19 as the game video. Specifically, the video device 13 displays a video in which a personified object cycles on a bike in the simulated scene. The game video may be a live-action video or a CG (computer graphics) video.

The video device 13 further starts to measure index values (Step S102). The measured index values include index values based on a time period during which the state of the user 19 satisfies a behavior of the object in the simulated scene and a predetermined requirement. Specifically, the video device 13 measures a play time period and a synchronization distance. The play time period is a time period elapsed from the start of the game.

The synchronization distance is an example of the index value based on the time period during which the state of the user 19 satisfies the behavior of the object in the simulated scene and the predetermined requirement, which is a cumulative value of a distance equivalent to the distance over which the user 19 has cycled on the bike during a time period during which a difference between a speed at which the user 19 rotates pedals of the exercise device 11 and a speed at which the object pedals the bike in the simulated scene is equal to or smaller than a predetermined value.

For example, a speed of rotation of the pedals of the bike of the object is assumed to be a speed at which the object pedals the bike, and is set as a target rotation speed. The target rotation speed is set in advance in the game. The target rotation speed may be a fixed value or a variable value. The rotation speed of the pedals of the exercise device 11 is assumed to be a speed at which the user 19 rotates the pedals of the exercise device 11, and is set as an actually measured rotation speed. The actually measured rotation speed is shown in the notification information transmitted from the exercise device 11 to the video device 13 or can be calculated from the notification information.

When the difference between the actually measured rotation speed and the target rotation speed is equal to or smaller than the predetermined value, the video device 13 determines that the user 19 is in synchronization with the object, and measures a time period during which the user 19 is in synchronization with the object as a synchronization time period.

When it is assumed that the synchronization time period is represented by Tsyn [sec], the target rotation speed is represented by R [rpm (revolutions per minute)], and the distance over which the bike moves forward while the pedals rotate once is represented by l [m], the synchronization distance Lsyn [m] can be calculated based on Expression (1).

$$Lsyn = l \times Tsyn \times (R/60) \quad (1)$$

Note that Expression (1) is for calculating the synchronization distance by using the target rotation speed, but the calculation of the synchronization distance is not limited thereto. The synchronization distance may also be calculated using not the target rotation speed, but the actually measured rotation speed instead of the target rotation speed.

Figure 6:
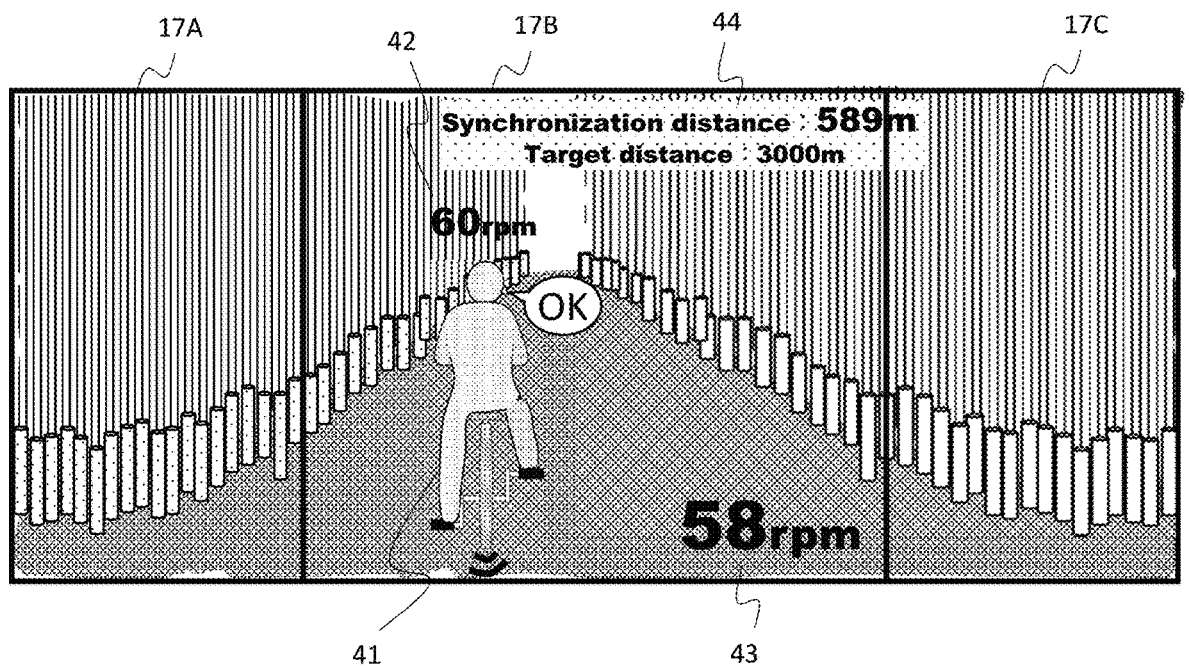
FIG. 6 is a diagram illustrating an example of a game video displayed by a video device.

FIG. 6 is a diagram illustrating an example of the game video displayed by the video device. In FIG. 6, the screens 17A, 17B, and 17C of the video device 13 are illustrated. The screens 17A and 17C are actually disposed at 90 degree angles to the screen 17B located on the front side of the user 19 so as to surround the user 19, as described above. However, in FIG. 6, to allow details of the video to be more easily viewed, the screens 17A and 17C are in a state spreading together with the screen 17B in the same plane.

Referring to FIG. 6, on the screens 17A to 17C, a personified object 41 simulating the instructor cycling on the bike in the simulated scene is displayed. When the user 19 rotates the pedals of the exercise device 11, a background video in the simulated scene moves with the rotation of the pedals. The user 19 pedals the bike to cycle together with the object 41 in the simulated scene.

In the vicinity of the object 41, a target rotation speed indicator 42 indicating the target rotation speed is displayed. The target rotation speed is 60 [rpm] herein. In a lower right area of the screen 17B, an actually measured rotation speed indicator 43 indicating the actually measured rotation speed is displayed. The user 19 rotates the pedals of the exercise device 11 at 58 [rpm]. Meanwhile, in an upper right area of the screen 17B, a game state display 44 is displayed. The game state display 44 displays the synchronization distance and a distance (target distance) to be traveled at a speed within a predetermined range of the speed of the instructor. The synchronization distance and the target distance are 589 [m] and 3000 [m] herein.

Back to FIG. 5, the video device 13 determines whether or not the synchronization distance Lsyn has reached a predetermined target distance (threshold Lth) (Step S103). When the synchronization distance Lsyn has reached the target distance Lth, the video device 13 determines that the game is cleared and displays that the game is cleared (Step S104).

When the synchronization distance has not reached the target distance, the video device 13 determines whether or not the play time period Tply has reached a limit time period (threshold Tmax) (Step S105). When the play time period Tply has reached the limit time period Tmax, the video device 13 determines that the game is over, and displays that the game is over (Step S106).

Thus, in the exercise equipment 10 according to Embodiment 1, the video device 13 continuously displays the object 41 that behaves in the simulated scene viewable from the user 19, measures each of the index values based on the time period during which the state of the user 19 satisfies the behavior of the object 41 in the simulated scene and the predetermined requirement, and displays the end of the exercise in the simulated scene when the index value reaches the predetermined value. By performing the exercise so as to satisfy the behavior of the object 41 and the predetermined requirement, the user 19 can perform the exercise involving such senses of realism and immersion as to allow the user 19 to feel like performing the exercise following the instructor in the simulated scene. In addition, by causing the object 41 to appropriately behave in the simulated scene, it is also possible to cause the user to perform an effective exercise. In the simulated scene, the object 41 also cycles on the bike and therefore, by adjusting the exercise such that the user cycles at the same speed, it is possible to allow the user to easily perform the effective exercise.

Note that the video device 13 changes the display on the viewing surface in response to, e.g., movement of the viewpoint position 19A of the user 19 to the outside of the predetermined range during the game. For example, when the user stops exercising or stops the exercise device 11, the video device 13 stops the video or displays a predetermined image including a menu, a text, and so forth in conjunction therewith. Since it is possible to change the display on the viewing surface in such a case where the user 19 leaves the exercise device 11, it is possible to enhance the convenience of the exercise equipment 10.

Additionally, in Embodiment 1, the example is shown in which the object performs the same exercise as performed by the user 19, but the object may also performs another behavior. For example, the object may also simulate an instructor who is a motorcycle rider leading the user 19. Alternatively, the object may also simulate an instructor who is an automobile driver driving ahead of the user 19 and speaks to the user 19. Still alternatively, the object need not be personified. For example, it may also be possible to display the object which is a marker to be targeted by the user 19. It may also be possible to display a plurality of the objects.

In Embodiment 1, the object 41 performs substantially the same behavior as that performed by the user 19. Accordingly, by imitating the behavior of the object 41 in the simulated scene, the user 19 can easily perform the exercise.

As described above, in a basic part of the game in Embodiment 1, the exercise device 11 is the fitness bike for causing the user 19 to perform the exercise simulating cycling on the bike. The video device 13 is configured to display the object 41 that cycles on the bike in the simulated scene, measure the time period during which a speed at which the user 19 rotates the pedals satisfies a speed at which the object 41 rotates the pedals of the bike and the predetermined requirement, and cause the object to display an end of the cycling on the bike in the simulated scene when the measured time period reaches the predetermined time period. To this game, such a configuration and an operation as described below may also be added.

The video device 13 may also display a video in which the object 41 encourages the user 19 to adjust the speed based on a difference between the speed at which the user 19 rotates the pedals and the speed at which the object 41 rotates the pedals.

Alternatively, it may also be possible that the measurement device 12 specifies tilting of a predetermined body region (e.g., neck or trunk) by the user 19, tilting of the exercise device 11 by the user 19, or tilting of handlebars of the exercise device 11 as an indication behavior and, when the indication behavior is specified, the video device 13 displays a video in the simulated scene which is viewable from the user 19 when the bike of the user 19 in the simulated scene is caused to make a predetermined motion. At that time, for example, the measurement device 12 may appropriately estimate the shape of the human body based on an image at a depth acquired by the sensor 16 and specify, based on the shape of the human body, the tilting of the predetermined region. The measurement device 12 may appropriately estimate the shape of the exercise device 11 based on the image at the depth acquired by the sensor 16 and specify, based on the shape, the tilting of the exercise device 11 or the handlebars of the exercise device 11.

Since the fitness bike actually does not move, it is difficult to represent the movement of the bike in the simulated scene by using the movement of the fitness bike. However, with this configuration, it is possible to allow an intuitive behavior, such as tilting of the neck, to give movement to the bike in the simulated scene.

Specifically, it may be possible that the measurement device 12 specifies the tilting of the predetermined body region (e.g., neck or trunk) by the user 19, the tilting of the exercise device 11 by the user 19, or the tilting of the handlebars of the exercise device 11 as a direction indication behavior indicative of a direction of the tilting and, when the direction indication behavior is specified, the video device 13 moves the bike of the user 19 in the direction indicated by the direction indication behavior in the simulated scene. For example, it is possible to change a lateral position of the bike of the user 19 on a course and allow a behavior such as avoiding and overtaking an obstacle.

It may also be possible that the measurement device 12 specifies standing up of the user 19 on the pedals of the exercise device 11 and, when the user 19 stands up on the pedals, the video device 13 displays a video in a simulated scene which is viewable from the user 19 when the user 19 performs a predetermined behavior in the simulated scene. The behavior of the user 19 on the exercise device 11 such as the fitness bike is limited. However, with this configuration, it is possible to use the motion of standing up on the pedals to cause the user 19 to perform the behavior in the simulated scene. For example, in the simulated scene, it is possible to cause the user 19 to simulate a behavior such as reaching over and grabbing of an object on the course.

A game using the plurality of exercise equipment items 10 in combination is also possible. It is possible for the respective users 19 of the individual exercise equipment items 10 to play against each other or cooperate to attain an object.

In that case, it may also be possible that the video device 13 of any of the exercise equipment items 10 transmits host user information based on the state of the user (host user) 19 of the exercise equipment item 10 to another of the exercise equipment items 10, receives other user information from the other exercise equipment item 10 based on the state of the user (other user) 19 of the other exercise equipment item 10, and displays an object that behaves in the simulated scene viewable from the host user 19 based on the other user information. At this time, the transmission/reception of the host user information and the other user information may be implemented by any communication means such as wired or wireless communication or a combination of the wired communication and the wireless communication. The plurality of exercise equipment 10 may be adjacent to each other or at remote places.

Note that, in the configuration shown by way of example in Embodiment 1, the screen 17A and the screen 17B have the 90 degree angle formed therebetween, while the screen 17C and the screen 17B have the 90 degree angle formed therebetween, but another configuration is also possible. The viewing surface includes local viewing surfaces on a plurality of planes having predetermined angles formed therebetween, and the video device 13 follows the movement of the viewpoint position 19A to generate, for each of the plurality of planes, a display video which simulates how an object appears when the object is viewed via the local viewing surface on the plane and display the display video on the local viewing surface on the plane. By using the viewing surfaces on the plurality of planes having the predetermined angles formed therebetween, the video device 13 provides the user with the video spanning a wide angle, and can thereby provide the exercising user with an intense sense of realism and an intense sense of immersion. The plurality of planes mentioned above are not limited to the three planes shown by way of example in Embodiment 1. The viewing surfaces on two, four, or more planes may also be used.

Also, in Embodiment 1, the video device 13 follows the viewpoint position 19A to generate the display video, but it may also be possible to provide different followabilities in a horizontal direction and in a vertical direction. The measurement device 12 measures the viewpoint position 19A as three-dimensional coordinates including a two-dimensional position on a horizontal plane and a position in a height direction. The video device 13 may appropriately generate the display video through following processing performed on the viewpoint position 19A which is different on the horizontal plane of the viewpoint position 19A and in the height direction thereof. Movement of the head region in the horizontal direction due to muscle strength and movement of the head region in a vertical direction which is affected not only by the muscle strength, but also by a gravity force may exhibit different properties. By performing different following processing on these, it is possible to provide the user 19 with a more appropriate video.

Also, in Embodiment 1, the video device 13 preliminarily stores, as the original video, the three-dimensional video representing the three-dimensional object in the virtual space in the internal storage device, and generates the display video from the three-dimensional video by such processing as to allow the three-dimensional object in the virtual space to seem to the user 19 to be a concrete and natural image so as to give the illusion to the user 19 that the three-dimensional object is actually there. However, in a modification, it may also be possible to use, as the display video, a three-dimensional video including two videos to which a disparity between left and right eyes has been given. The video device 13 includes a display device that displays the display video on a viewing surface and a three-dimensional eyeglass device to be worn by the user, and the display device generates, based on the viewpoint position 19A, the two display videos for the left and right eyes having the disparity therebetween and displays the display videos on the viewing surface. The three-dimensional eyeglass device shows the two display videos respectively to the left and right eyes of the user 19. By providing the video based on the viewpoint position 19A of the user 19 with the disparity between the left and right eyes, it is possible to provide the user 19 with a sense of solidity of the video and provide the user 19 with an intenser sense of realism and an intenser sense of immersion.

Note that a type of the three-dimensional video for the display device and the three-dimensional eyeglasses according to this modification is not particularly limited. For example, the three-dimensional video may be of an anaglyph type, a polarization type, or a liquid crystal shutter type. Note that, in general, three-dimensional eyeglasses do not give a sense of uneasiness or discomfort as given by a head-mounted display.

Embodiment 2

In Embodiment 1, as illustrated in FIG. 1 and FIG. 4, the configuration in which, in the video device 13, the one projection device 15 projects the display video on the three screens 17A, 17B, and 17C is shown by way of example. By contrast, in Embodiment 2, an example using three projection devices is shown. A configuration and an operation of exercise equipment in Embodiment 2 are basically the same as those in Embodiment 1, but are different from those in Embodiment 1 in a configuration having the three projection devices and an operation related to the configuration. A description will be given mainly of points in Embodiment 2 which are different from those in Embodiment 1.

Figure 7:
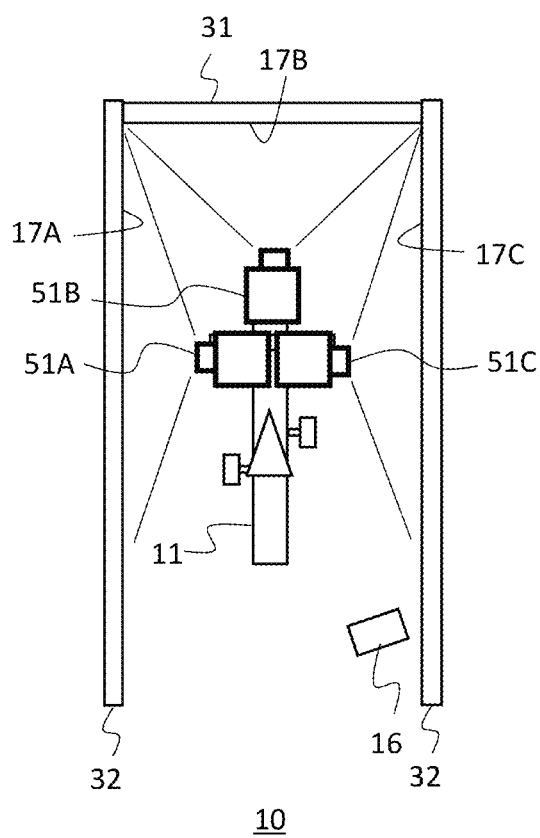
FIG. 7 is a plan view for illustrating exercise equipment according to Embodiment 2.

FIG. 7 is a plan view for illustrating the exercise equipment according to Embodiment 2. As illustrated in FIG. 7, the exercise equipment 10 in Embodiment 2 includes three projection devices 51A, 52B, and 53C. The projection device 51A projects a display video on the screen 17A. The projection device 51B projects a display video on the screen 17B. The projection device 51C projects a display video on the screen 17C. Since the configuration in which the videos are projected respectively from the projection devices 51A, 51B, and 51C on the screens 17A, 17B, and 17C is used, a bright video can be displayed over a wide area.

Embodiment 3

In Embodiment 1, the example is shown in which the video device 13 calculates the movement distance and the moving speed based on the notification information related to the movement distance from the exercise device 11. By contrast, in Embodiment 3, the measurement device that specifies the viewpoint position of the user specifies an exercising state of the user and reports the exercising state to the video device 13, and the video device 13 calculates the movement distance and the moving speed based on the exercising state of the user reported from the measurement device 12.

A configuration and an operation of exercise equipment in Embodiment 3 are basically the same as those in Embodiment 1, but the exercise equipment in Embodiment 3 is different from that in Embodiment 1 in a configuration and an operation in which the measurement device that specifies the viewpoint position of the user specifies the exercising state of the user and reports the exercising state to the video device 13, and the video device 13 calculates the movement distance and the moving speed based on the exercising state of the user reported from the measurement device 12. A description will be given mainly of points in Embodiment 3 which are different from those in Embodiment 1.

To specify the viewpoint position, the measurement device 12 images the user 19 performing an exercise by using the exercise device 11. In Embodiment 3, the image data obtained through the imaging by the measurement device 12 is used also to specify the state of the user 19. Thus, the measurement device 12 uses the image data obtained by imaging the user 19 to acquire the state of the user 19 and acquire the viewpoint position of the user 19, and therefore the efficient configuration can implement the exercise that allows a sense of realism and a sense of immersion to be obtained. The state of the user 19 mentioned herein includes a state where the user 19 is dynamic and a state where the user 19 is static. As the dynamic state, a state where the user 19 is performing a cycling exercise and a rotation speed of pedals during the cycling exercise can be specified. Meanwhile, as the static state, a state where the hip region of the user 19 is kept away from a saddle, a state where the user 19 has stopped exercising, a state were the user 19 is riding on the exercise device 11, a state where the user 19 has raised hands, or the like can be specified.

An example in which the state where the user 19 is performing the cycling exercise and the rotation speed of the pedals during the cycling exercise are specified is shown herein.

The video device 13 displays, based on the state of the user 19, a video in a virtual space viewable from the user 19, which changes with simulated movement of the user 19 in an exercise simulating movement, on the viewing surface of the screen 17. Since the video changing with the movement of the user 19 in a simulated world, which is recognized from the state of the imaged user 19, is displayed on the viewing surface, in the same manner as in Embodiment 1, it is possible to provide the user 19 with such a sense of realism and a sense of immersion as to allow the user 19 to feel like performing the exercise in the world in the video.

Specifically, the sensor 16 of the measurement device 12 measures depths of objects (which are the user 19 and an object therearound) at individual pixels, and the information processing device 14 specifies the state of the user based on the depths at the individual pixels measured by the sensor 16. Since the state of the user 19 is specified using a depth image, it is possible to stably determine the state of the user 19, while suppressing the influence of colors of the video displayed on the viewing surface and what is worn by the user 19.

The exercise equipment 10 in Embodiment 3 is equipment for the user 19 to perform an exercise which causes a specific body region to perform a repetitive motion. Specifically, the user 19 uses the fitness bike to alternately move both legs up and down. A calculation unit implemented by the information processing device 14 specifies the state of the user 19 based on depth values at the pixels in a predetermined area. Since the exercise is identified based on changes caused in the depth values in the predetermined area by the repetitive motion of the specific region, it is possible to stably identify the repetitive motion by suppressing the influence of the color and shape of what is worn by the user.

More specifically, the calculation unit specifies the state of the user 19 according to an index value based on a total sum of the depth values at the pixels in an area in and out of which the specific region moves due to the repetitive motion. The specific region is the leg herein. Since the total sum of the pixel values in the area in and out of which a predetermined region moves due to the repetitive motion is different from that when the specific region is not observed, it is possible to specify the state of the user based on the total sum.

Figure 8:
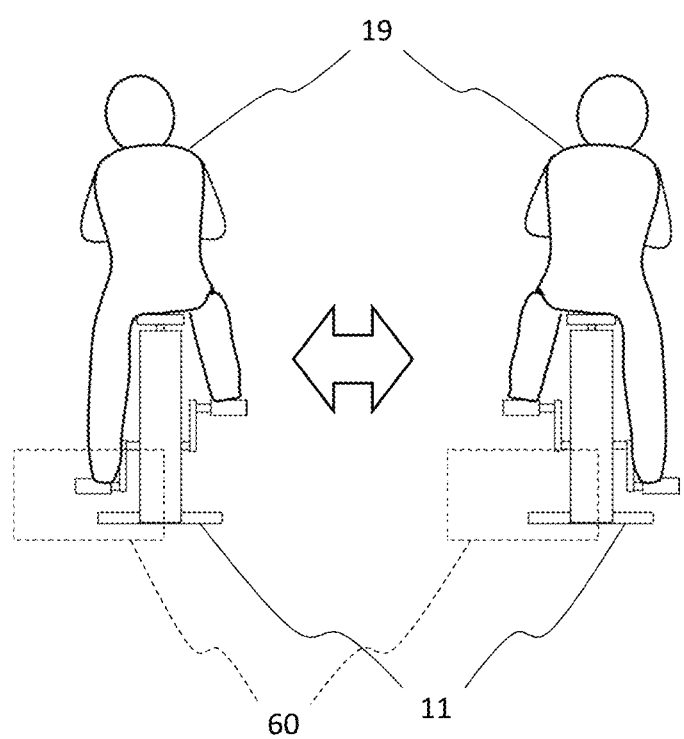
FIG. 8 is a conceptual view for illustrating a method of specifying a state of a user in Embodiment 3.

FIG. 8 is a conceptual view for illustrating a method of specifying the state of the user in Embodiment 3. As illustrated in FIG. 8, when the user 19 uses the exercise device 11 to exercise, the leg of the user 19 moves in and out of an area 60 in the vicinity of the pedal, and the depth values at the pixels vary. Thus, the area in which the depth values at the pixels vary due to the exercising by the user 19 is set in advance depending on the exercise device 11.

The calculation unit specifies the state of the use according to the index value based on the total sum of the depth values at the pixels in the area in and out of which the specific region (which is the leg in FIG. 8) moves due to the repetitive motion of the user 19. Examples of the index value based on the total sum of the depth values include a total sum of the depth values, an average value of the depth values, and the like. Since the total sum of the pixel values in the area in and out of which the predetermined region moves due to the repetitive motion is different from that when the specific region is not observed, it is possible to specify the state of the user based on the total sum.

Figure 9:
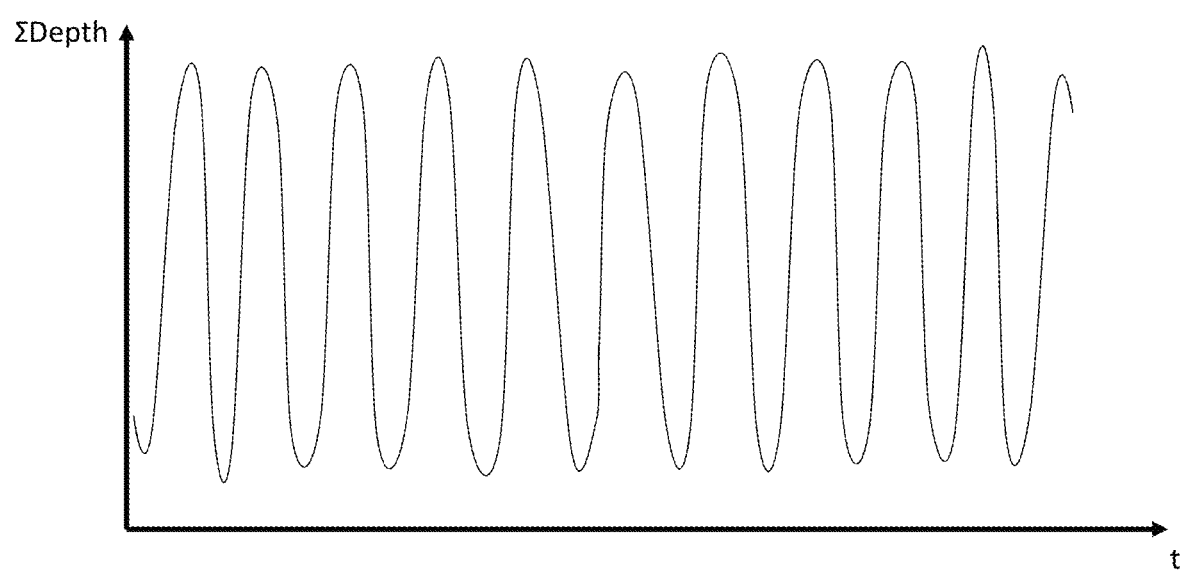
FIG. 9 is a graph illustrating an example of a total sum of depth values at pixels in an area in and out of which a specific region of the user moves.

FIG. 9 is a graph illustrating an example of the total sum of the depth values at the pixels in the area in and out of which the specific region of the user moves. FIG. 9 is the graph illustrating a time variation of the total sum of the depth values at the individual pixels in the area 60 when the user 19 is performing the cycling exercise. Since relative maximum points and relative minimum points are periodically observed in a total sum value, it will be understood that the user 19 is performing cycling at a given speed. In addition, from the period thereof, the rotation speed of the pedal can be calculated. For example, a time period required by the total sum value to move from one of the relative maximum points to the next relative maximum point via the relative minimum point represents a rotation period of the pedal.

In Embodiment 3, the example is shown in which the state of the user 19 is specified according to the index value based on the total sum of the depth values, but another method is also possible. For example, it may also be possible to specify the state of the user 19 according to an index value based on a total sum of pixel values in RGB or the like in a typical visible image such as a color image or a monochrome image of the area 60. When the leg of the user 19 moves in and out of the area 60, the total sum of the pixel values varies, and accordingly it is possible to specify the state of the user 19 from the index value based on the total sum of the pixel values. When a marker is attached to the leg of the user 19 or to the pedal of the exercise device 11, accuracy of specifying the state of the user 19 from pixel values in the typical visible image is improved. As the marker, a reflector, an infrared LED (Light Emitting Diode), a two-dimensional barcode, or the like can be used. It may also be possible to use both of the depth values at the individual pixels in the depth image and the pixel values at the individual pixels in the visible image to specify the state of the user 19.

In Embodiment 3, the video device 13 uses the state of the user specified as described above to control the display video. For example, the rotation speed of the pedal is used as the actually measured rotation speed in the game described above to calculate the synchronization time period Tsyn and used as a value to be displayed on the actually measured rotation speed indicator 43 (see FIG. 6) displayed on the screen 17.

The measurement device 12 in Embodiment 3 may also perform calibration of parameters before the processing of specifying the state of the user 19. For example, it may also be possible to encourage the user 19 to perform the cycling exercise before the start of the game and acquire appropriate parameters during the cycling exercise.

The calculation unit of the measurement device 12 acquires substantial maximum and minimum values of the index value while the user 19 is performing the exercise. Then, the calculation unit uses the acquired maximum and minimum values to specify the state of the user 19. For example, the substantial maximum and minimum values may also be thresholds which allow the calculation unit to determine that the index value has reached the relative maximum point or the relative minimum point. It may be possible to use a value obtained by subtracting a predetermined value from the maximum value as a threshold for determining that the index value has reached the relative maximum point. It may also be possible to use a value obtained by adding a predetermined value to the minimum value as a threshold for determining that he index value has reached the relative minimum point. Since the substantial maximum and minimum values of the index value are thus acquired to be used to specify the state of the user, even when a size of the specific region and what is warn differ from one user to another, it is possible to successfully specify the state of the user.

Embodiment 4

In Embodiment 1, the example is shown in which the three plane screens 17A, 17B, and 17C are used, but another configuration is also possible. In Embodiment 4, a configuration using a curved screen is shown by way of example.

Figure 10:
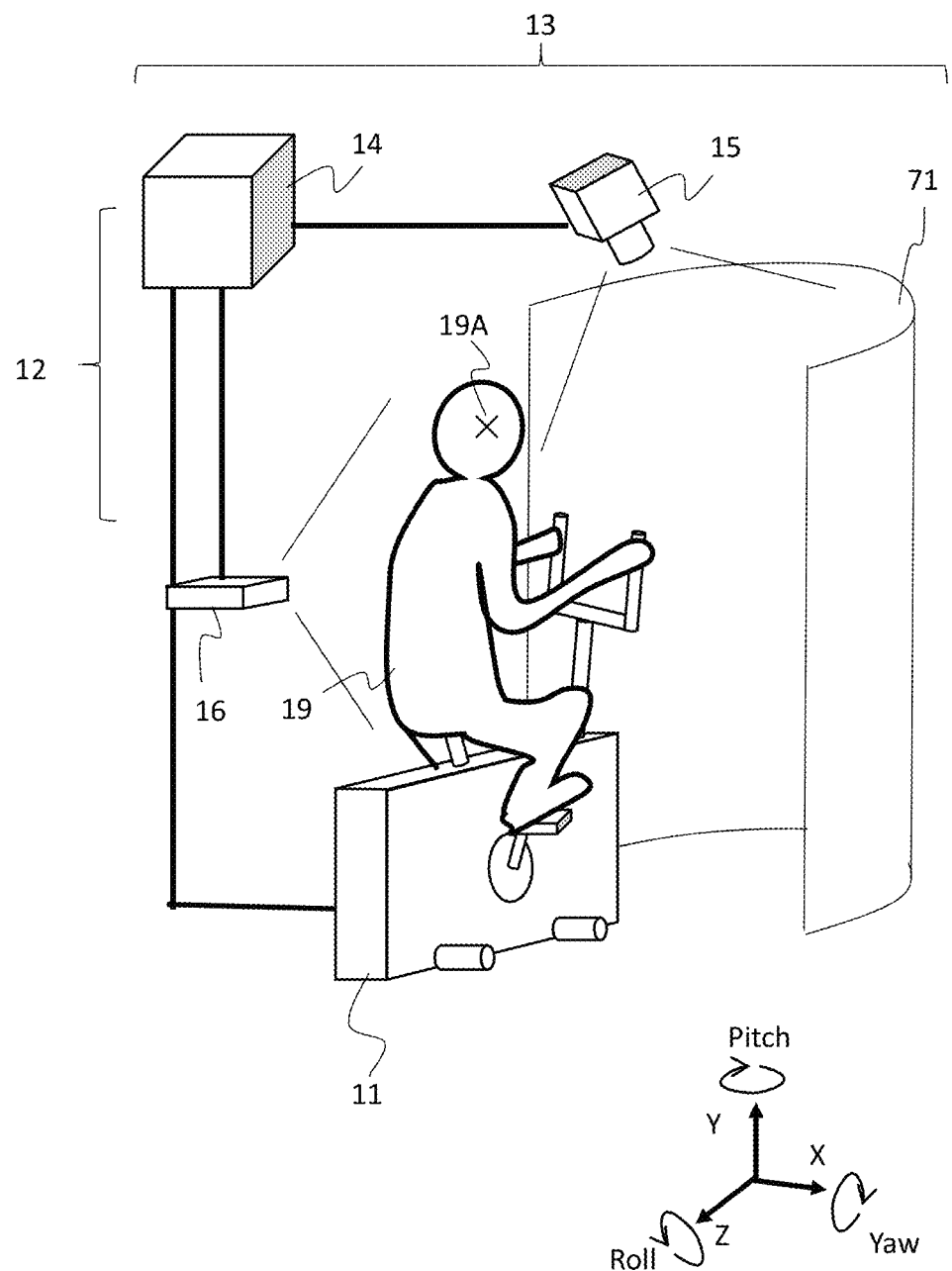
FIG. 10 is a schematic plan view of exercise equipment according to Embodiment 4.

FIG. 10 is a schematic plan view of exercise equipment according to Embodiment 4. The exercise equipment 10 in Embodiment 4 is different from that in Embodiment 1 illustrated in FIG. 1 in that, instead of the three screens 17A, 17B, and 17C in the exercise equipment in Embodiment 1, one curved screen 71 is used. Embodiment 4 is otherwise the same as Embodiment 1.

Processing in the video device 13 in Embodiment 4 is also basically the same as that in Embodiment 1. The video device 13 generates, based on the viewpoint position 19A, a display video of an object in a virtual space in a reference coordinate system which simulates how the object appears when the object is viewed from the viewpoint position 19A via a viewing surface of the fixed screen 71, and displays the display video on the viewing surface of the screen 71 fixed in the reference coordinate system.

The screen 71 has the curved viewing surface. More specifically, the screen 71 has a shape including the curved viewing surface corresponding to at least a part of a circumferentially extending inner surface of a cylindrical shape surrounding at least the head region of the user 19.

The video device 13 displays, on each of portions of the viewing surface of the screen 71, a display video of the object in the virtual space which is viewable from the viewpoint position 19A via each of the portions of the viewing surface. For example, the video device 13 preliminarily stores, as an original video, a three-dimensional video representing a three-dimensional object in the virtual space in an internal storage device, and generates the display video from the three-dimensional video by such processing as to allow the three-dimensional object in the virtual space to seem to the user 19 to be a concrete and natural image so as to give the illusion to the user 19 that the three-dimensional object is actually there. At that time, when generating an image to be displayed on the viewing surface of the screen 71, the video device 13 performs projection transform by which the three-dimensional object in the virtual space, which is defined in three-dimensional data, is projected on the viewing surface of the screen 71, i.e., a two-dimensional plane.

In Embodiment 4 also, in the same manner as in Embodiment 1, the video device 13 includes the viewing surface including the front side of the user 19 and surrounding at least apart of the periphery of the user 19, follows the movement of the viewpoint position 19A to generate the display video which simulates how the object appears when the object is viewed via the viewing surface and display the display video on the viewing surface. By using the viewing surface surrounding at least a part of the periphery of the user 19, it is possible to provide the user 19 with the video spanning a wide angle and, by following the viewpoint position 19A and controlling the display video, it is possible to display the video which is natural to the user 19 irrespective of the shape of the viewing surface and consequently provide the exercising user 19 with an intense sense of realism and an intense sense of immersion.

Also, in Embodiment 4, the viewing surface of the screen 71 includes the curved viewing surface corresponding to at least a part of the circumferentially extending inner surface of the cylindrical shape surrounding at least the head region of the user 19, and the video device 13 follows the movement of the viewpoint position 19A to generate the display video which simulates how the object appears when the object is viewed via each of portions of the curved viewing screen, and displays the display video on each of the portions of the curved viewing surface. Since the curved viewing surface corresponding to at least a part of the circumferentially extending inner surface of the cylinder is used to provide the user 19 with the video spanning the wide angle, it is possible to provide the exercising user 19 with an intense sense of realism and an intense sense of immersion.

Embodiment 5

In Embodiment 5, a configuration using a curved screen different from that in Embodiment 4 is shown by way of example.

Figure 11:
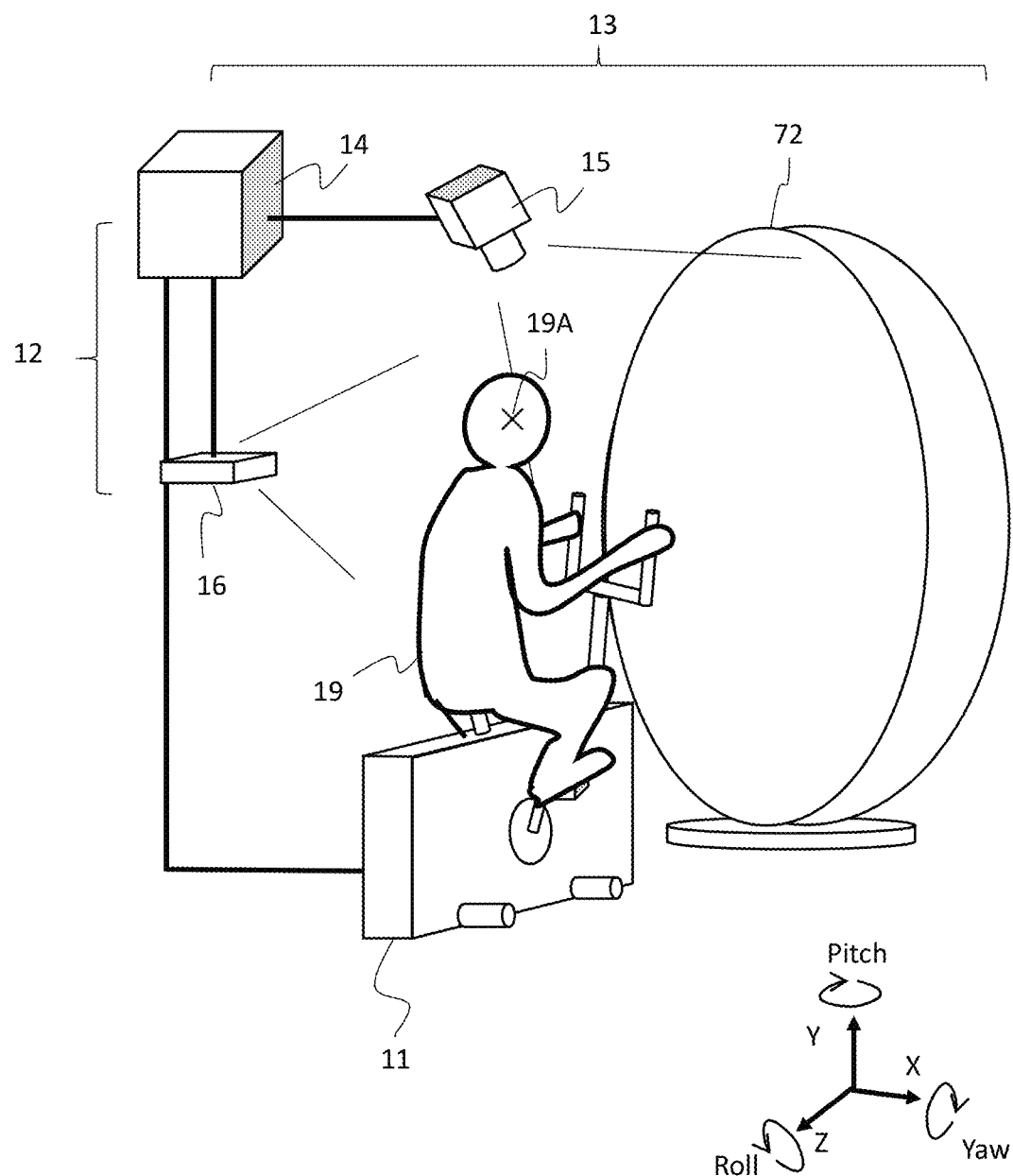
FIG. 11 is a schematic configuration diagram of exercise equipment according to Embodiment 5.

FIG. 11 is a schematic configuration diagram of exercise equipment according to Embodiment 5. The exercise equipment 10 in Embodiment 5 is different from that in Embodiment 1 illustrated in FIG. 1 in that, instead of the three screens 17A, 17B, and 17C in the exercise equipment in Embodiment 1, one curved screen 72 is used. Embodiment 5 is otherwise the same as Embodiment 1.

Processing in the video device 13 in Embodiment 5 is also basically the same as that in Embodiment 1. The video device 13 generates, based on the viewpoint position 19A, a display video of an object in a virtual space in a reference coordinate system which simulates how the object appears when the object is viewed from the viewpoint position 19A via the fixed viewing surface, and displays the display video on a viewing surface of the screen 72 fixed in the reference coordinate system.

The viewing surface of the screen 72 has a shape including the curved viewing surface corresponding to a part of an inner surface of a spherical shape surrounding at least the head region of the user 19.

The video device 13 displays, on each of portions of the viewing surface of the screen 72, a display video of the object in the virtual space which is viewable from the viewpoint position 19A via each of the portions of the viewing surfaces. For example, the video device 13 preliminarily stores, as an original video, a three-dimensional video representing a three-dimensional object in the virtual space in an internal storage device, and generates the display video from the three-dimensional video by such processing as to allow the three-dimensional object in the virtual space to seem to the user 19 to be a concrete and natural image so as to give the illusion to the user 19 that the three-dimensional object is actually there. At that time, when generating an image to be displayed on the viewing surface of the screen 72, the video device 13 performs projection transform by which the three-dimensional object in the virtual space, which is defined in the three-dimensional data, is projected on the viewing surface of the screen 72, i.e., a two-dimensional plane.

Also, in Embodiment 5, the viewing surface of the screen 72 includes the curved viewing surface corresponding to a part of the inner surface of the spherical shape surrounding at least the head region of the user 19, and the video device 13 follows the movement of the viewpoint position 19A to generate the display video which simulates how the object appears when the object is viewed via each of the portions of the curved viewing surface, and displays the display video on each of the portions of the curved viewing surface. Since the curved viewing surface corresponding to a part of the circumferentially extending spherical inner surface is used to provide the user 19 with the video spanning the wide angle, it is possible to provide the exercising user 19 with an intense sense of realism and an intense sense of immersion.

Embodiment 6

In Embodiment 1, the example is shown in which the exercise device 11 is the fitness bike for performing the cycling exercise, but another configuration is also possible. In Embodiment 6, an example is shown in which the exercise device 11 is a treadmill for performing running or walking.

Figure 12:
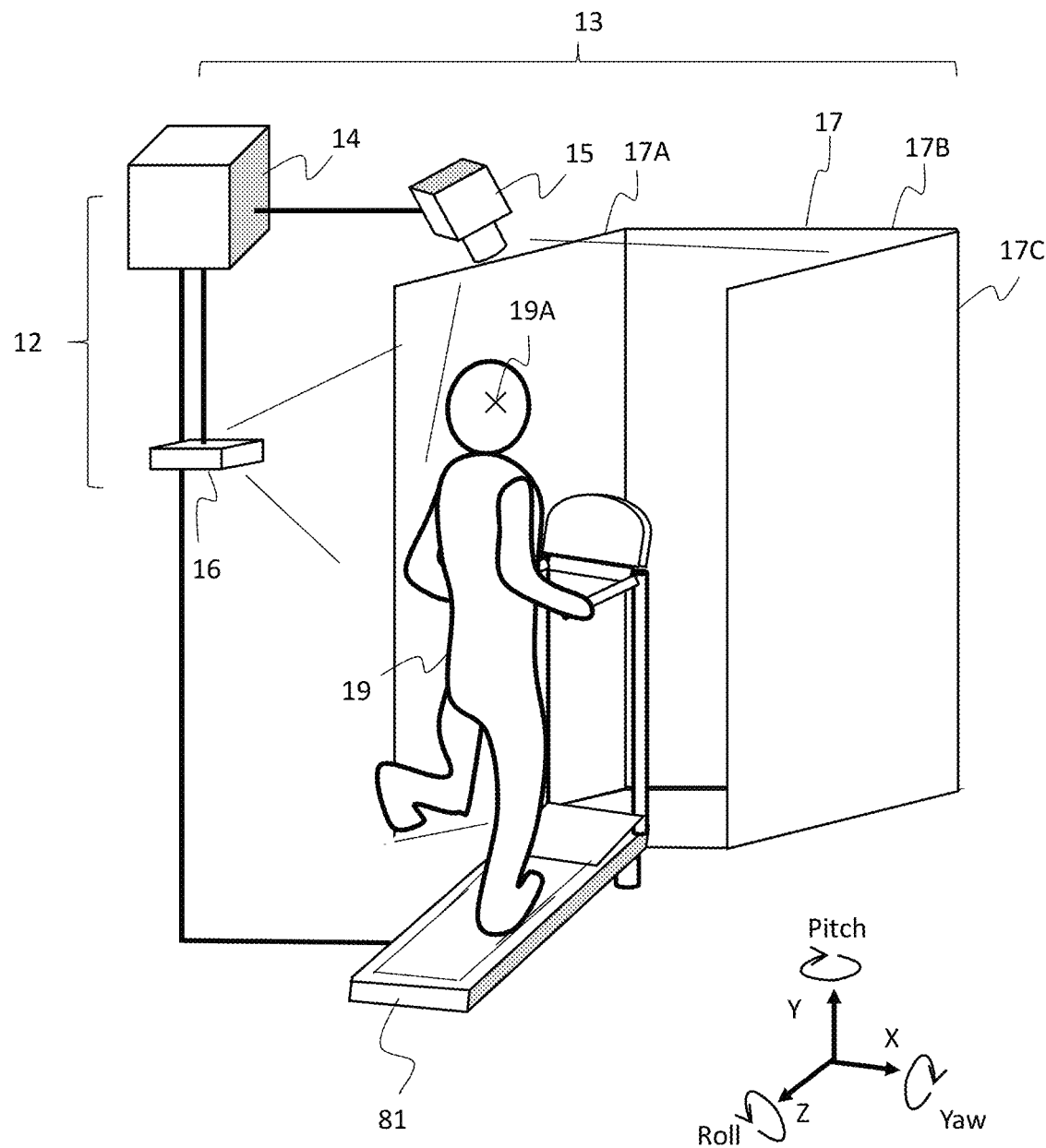
FIG. 12 is a schematic configuration diagram of exercise equipment according to Embodiment 6.

FIG. 12 is a schematic configuration diagram of exercise equipment according to Embodiment 6. The exercise equipment 10 according to Embodiment 6 is different from that according to Embodiment 1 in that, instead of the exercise device 11, an exercise device 81 is included therein. Embodiment 6 is basically otherwise the same as Embodiment 1.

The exercise device 81 is a device for performing running or walking on a stepping deck. In particular, in a running motion, the viewpoint position 19A of the user 19 is affected by a gravity force, and a speed of a motion in a vertical direction is higher than that in the fitness bike in Embodiment 1.

Accordingly, Embodiment 6 uses, as a dispensable configuration, a configuration in which the measurement device 12 measures the viewpoint position 19A as three-dimensional coordinates including a two-dimensional position on a horizontal plane and a position in a height direction, and the video device 13 generates a display video by following processing performed on the viewpoint position 19A, which differs on the horizontal plane of the viewpoint position 19A and in the height direction thereof. Movement of the head region in a horizontal direction due to muscle strength and movement of the heat region in the vertical direction which is further affected by the gravity force may exhibit different properties. By performing the different following processing on these, it is possible to provide the user with a more appropriate video.

A more detailed description will be given below.

The video device 13 in Embodiment 6 uses a followability for movement of the viewpoint position 19A in the height direction which is equal to a followability for movement of the viewpoint position 19A on the horizontal plane for a given period of time immediately after the start of the exercise. Meanwhile, the video device 13 calculates a representative value of heights of the viewpoint position 19A. When the given period of time has elapsed, the video device 13 gradually reduces the followability to zero. When the followability reaches zero, the video device 13 fixes the height of the viewpoint position 19A to the representative value mentioned above. As an example of the representative value of the viewpoint position 19A, an average value of the heights of the viewpoint position 19A measured a predetermined number of times or during a predetermined period, a median value thereof, or the like may be used appropriately.

In Embodiment 6, by way of example, it is assumed that a movement distance of the viewpoint position 19A in the height direction is multiplied by a coefficient of 1 or less to reduce the followability.

Figure 13:
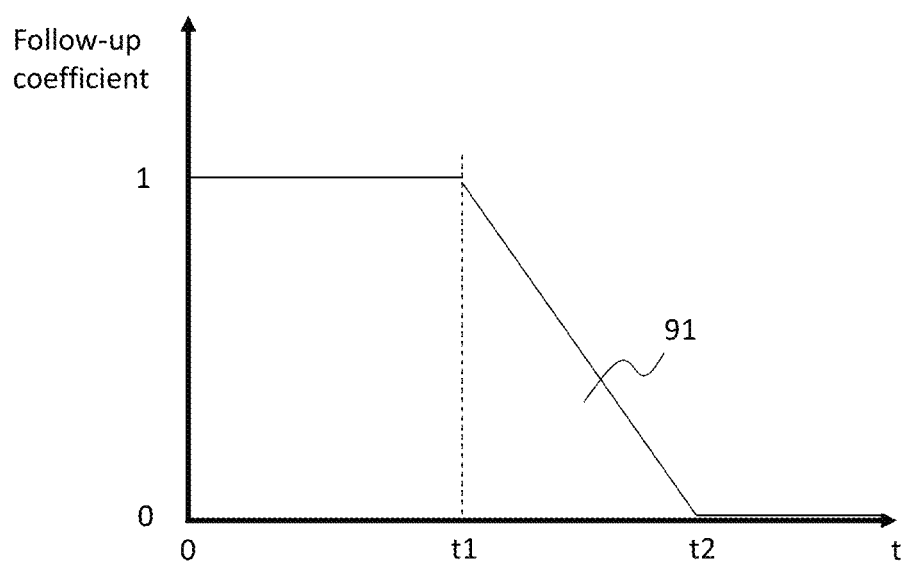
FIG. 13 is a graph illustrating an example of control of a followability in a height direction.

FIG. 13 is a graph illustrating an example of control of the followability in the height direction. The graph of FIG. 13 illustrates a time variation of the coefficient with respect to the movement distance in the height direction. During the given period of time (t=0 to t1) after the start of the exercise, the coefficient is 1. During a period t=t1 to t2, the coefficient decreases at a given gradient. At t=t2, the coefficient reaches zero and remains zero thereafter. The control is performed herein based on time, but the control may also be performed based on a travel distance instead of time.

Thus, the video device 13 sets the followability with respect to the movement of the viewpoint position 19A in the height direction lower than the followability with respect to the movement thereof on the horizontal plane. As a result, when the movement in the vertical direction includes movement quicker than the movement in the horizontal direction, it is possible to inhibit the display video from highly sensitively changing up and down.

The video device 13 also equally follows the movement of the viewpoint position 19A in the height direction and the movement thereof on the horizontal plane until a predetermined period of time elapses or a predetermined distance is reached after the user 19 began to run, and reduces the followability in the height direction mentioned above when the predetermined period of time mentioned above has elapsed or the predetermined distance mentioned above is reached. Thus, it is possible to reduce the followability when the user 19 is getting used to the exercise using the exercise device 11, and therefore it is possible to naturally reduce the followability, while maintaining a sense of realism and a sense of immersion.

The video device 13 also determines the representative value of the viewpoint position 19A in the height direction based on the viewpoint position 19A measured by the measurement device 12, fixes a level of the viewpoint position 19A in the height direction to the representative value, and generates the display video. As a result, the height of the viewpoint position 19A is fixed to an appropriate level, and therefore it is possible to more naturally display the video by using the followability in the horizontal direction.

Embodiment 7

In Embodiment 1, the example is shown in which the video device 13 uses, as the original video, the three-dimensional video representing the three-dimensional object in the virtual space, generates the display video from the three-dimensional video, and displays the display video. By contrast, in Embodiment 7, an example is shown in which a two-dimensional plane video is used as the original video. The plane video includes frames of a plurality of time-series plane images.

A basic configuration of the exercise equipment 10 in Embodiment 7 is the same as that in Embodiment 1 illustrated in FIG. 1.

The plane video is a video to be displayed on one plane such as a typical movie video. When the plane video is displayed without any modification over the screens 17A, 17B, and 17C, the displayed video seems unnatural to the user 19, and a sense of realism and a sense of immersion are reduced. The exercise equipment 10 in Embodiment 7 performs predetermined processing on the plane video to enhance the sense of realism and the sense of immersion.

Figure 14:
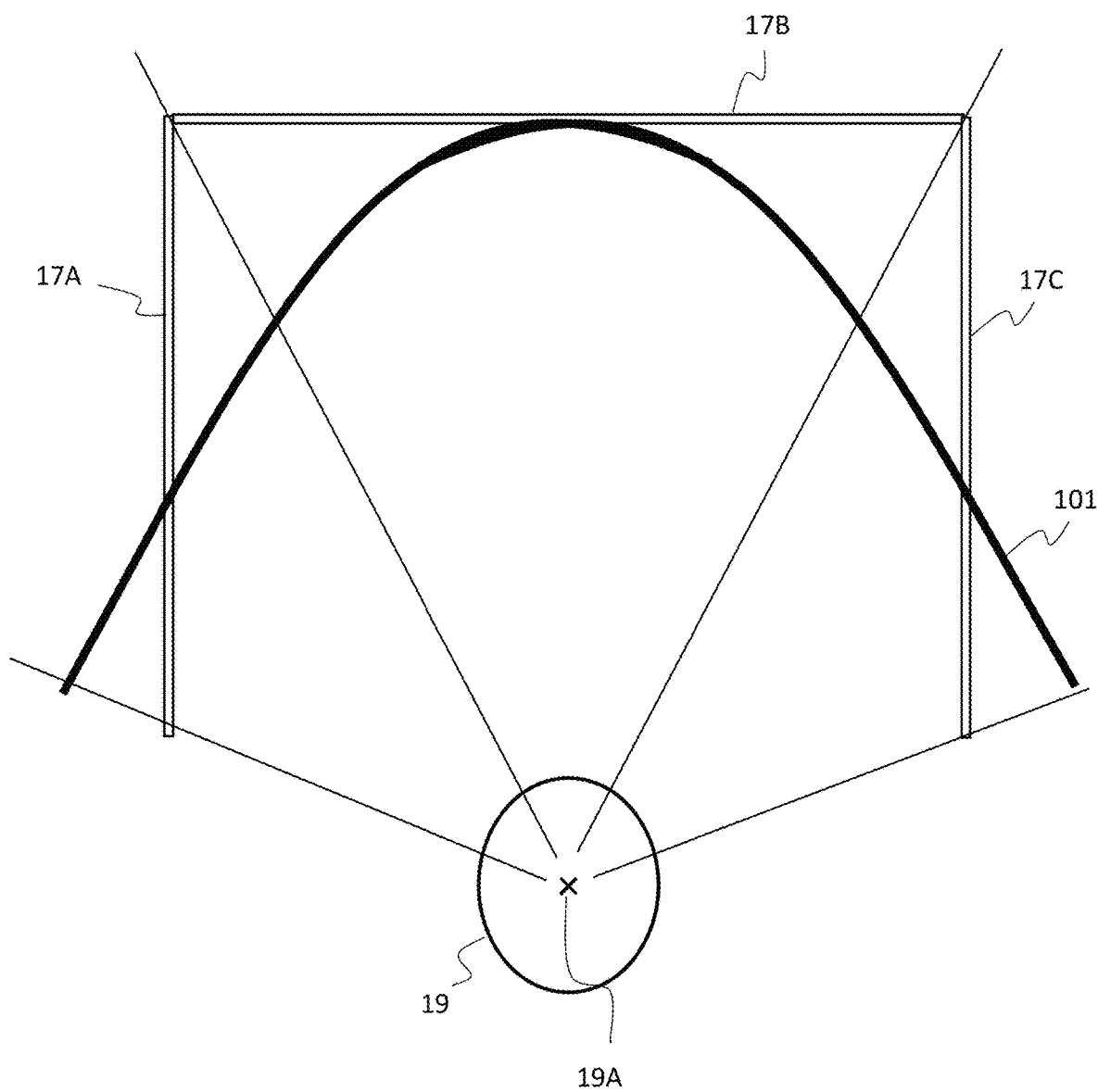
FIG. 14 is a conceptual view for illustrating generation of a display video in Embodiment 7.

FIG. 14 is a conceptual view for illustrating generation of a display video in Embodiment 7. In the conceptual view, the exercise equipment 10 is viewed from above.

In Embodiment 7, the video device 13 attaches, as a texture, a plane viewing surface included in the plane video to a surface of a virtual object for image transformation 101 in a virtual space, generates individual display viewing surfaces which simulate how the virtual object for image transformation 101 appears when the virtual object for image transformation 101 is viewed from the viewpoint position 19A specified by the measurement device 12 via the screens 17A, 17B, and 17C, and displays the individual display viewing surfaces on the respective screens 17A, 17B, and 17C. The screens 17A, 17B, and 17C are disposed so as to include the front side of the user 19 and surround at least a part of the periphery of the user 19, as described above. By way of example, the virtual object for image transformation 101 is an object having a curved surface such that lateral portions thereof are warped to a side on which the user 19 is located, and the video device 13 performs processing of attaching, as a texture, each of the plane images to the curved surface. By doing so, it is possible to display such a video as to surround the user 19 depending on the viewpoint position 19A of the user 19 and provide the user 19 with an intense sense of realism and an intense sense of immersion.

The video device 13 may also fix the viewpoint position 19A provisionally obtained by the measurement device 12 and generate a display viewing surface which simulates how the virtual object for image transformation 101 appears when the virtual object for image transformation 101 is viewed from the viewpoint position 19A but, preferably, the measurement device 12 continuously measures the viewpoint position 19A, and the video device 13 follows the viewpoint position 19A to generate a display video and display the display video on the viewing surfaces of the screens 17A, 17B, and 17C.

The plane video mentioned herein may be, e.g., a live-action video photographed by a camera, or may also be a two-dimensional video obtained by pre-rendering a three-dimensional video. The plane video may also be an image (mirrored image) retrieved in real time from an external device such as a camera, a tablet, a smartphone, or a personal computer.

In either case, the plane video may be a 360 degree video (i.e., a plane video pre-rendered as a live-action video photographed by a 360 degree camera and a 360 degree video) or may also be a screen video to be displayed on a typical plane viewing surface.

Note that, in Embodiment 7, the example is shown in which the display video is displayed over the screens 17A, 17B, and 17C that are contiguous to each other, while having 90 degree angles formed therebetween, but another configuration is also possible.

The video device 13 has a viewing surface including the front side of the user 19 and surrounding at least a part of the periphery of the user 19, and may appropriately generate, based on the viewpoint position 19A, a display video which simulates how an object appears when the object is viewed via the viewing surface and display the display video on the viewing surface. For example, the video device 13 may display the video on the screen 71 in Embodiment 4 illustrated in FIG. 10 or may also display the video on the screen 72 in Embodiment 5 illustrated in FIG. 11.

Embodiment 8

In Embodiment 1, the example is shown in which the video device 13 preliminarily stores the original video as video data, generates the display video from the original video, and displays the display video. By contrast, in Embodiment 8, the video device 13 has an external input interface for a video signal, generates the display video in real time from the original video input from the external input interface, and displays the display video.

The exercise equipment 10 in Embodiment 8 is different from that in Embodiment 1 in that the video device 13 has the external input interface described above, but a basic configuration of the exercise equipment 10 in Embodiment 8 is the same as that in Embodiment 1. The original video input from the external interface may be the same three-dimensional video as in Embodiment 1 or may also be the same plane video as in Embodiment 7.

Each of the embodiments described above has an explanatory configuration for describing details of this disclosure, and is not intended to limit the scope of this disclosure only to the embodiments thereof. A person skilled in the art can combine these with each other or implement these in various other modes without departing from the scope of the present invention. In addition, the description of each of the embodiments has a portion in which details such as a specific arithmetic expression for the projection transform are not clearly shown, but it goes without saying that a person skilled in the art can implement each of the embodiments.

REFERENCE SIGNS LIST

10 Exercise equipment
11 Exercise device
12 Measurement device
13 Video device
14 Information processing device
15 Projection device
16 Sensor
17, 17A, 17B, 17C Screen
19 User
19A Viewpoint position
21, 22, 23, 24, 25, 26, 27, 28 Object
31 Front wall
32 Lateral wall
41 Object
42 Target rotation speed indicator
43 Actually measured rotation speed indicator
44 Game state display
51A Projection device
51B Projection device
51C Projection device
60 Area
71 Screen
72 Screen
81 Exercise device
101 Virtual object for image transformation

The invention claimed is:

1. Exercise equipment comprising:
an exercise device for causing a user to perform a predetermined exercise which stimulates movement;
a measurement device configured to measure a viewpoint position of the user in a predetermined reference 3-D coordinate system when the user performs the exercise by using the exercise device; and
a video device including a fixed and unworn viewing surface configured to generate, based on the viewpoint position, a display video of a plurality of objects in a virtual space in the reference 3-D coordinate system which simulates how the plurality of objects appear when the plurality of objects are viewed from the viewpoint position via the viewing surface, and allows the user to view images as if moving in the virtual space, and display the display video on the viewing surface, wherein
the virtual space constitutes a three-dimensional video representing the plurality of objects as three-dimensional objects in the virtual space,
the video device modifies a perspective of the plurality of three-dimensional objects in the three-dimensional video as the user moves, based on the measured viewpoint position of the user in the predetermined reference 3-D coordinate system, and
the video device is configured to perform a transformation by which the plurality of objects in the virtual space, which are defined in three-dimensional data, are projected on the viewing surface to generate the display video.

2. The exercise equipment according to claim 1, wherein the measurement device is configured to continuously measure the viewpoint position, and
the video device is configured to follow the viewpoint position to generate the display video and display the display video on the viewing surface.

3. The exercise equipment according to claim 1, wherein the measurement device includes:
an imaging unit configured to image an area including a head region of the user; and
a calculation unit configured to determine the viewpoint position based on a position of the head region imaged by the imaging unit.

4. The exercise equipment according to claim 3, wherein
the imaging unit is an imaging device at a position higher than that of the head region of the user, and
the calculation unit is configured to extract the area of the head region from an image acquired by the imaging device and calculate the position of the head region based on a position of the area in the image.

5. The exercise equipment according to claim 3, wherein
the imaging unit includes a sensor device configured to measure a depth of a real object from the imaging unit at each of pixels, and
the calculation unit is configured to estimate a shape of a human body based on the depth at each of the pixels measured by the sensor device and determine the viewpoint position based on the position of the head region in the human body.

6. The exercise equipment according to claim 1, wherein the video device includes:
a screen configured to span a predetermined range including a front side of the user; and
a projector configured to project the display video on the screen.

7. The exercise equipment according to claim 1, wherein the video device includes:
a display device spanning a predetermined range including a front side of the user.

8. The exercise equipment according to claim 1, further comprising:
a first wall located on a front side of the user; and
a second wall which is in contact with the first wall at a 90 degree angle thereto, wherein
the video device includes:
a screen configured to span a predetermined range including the front side of the user; and
a projector configured to project the display video on the screen, and
the first wall and the second wall continuously form the screen.

9. The exercise equipment according to claim 8, wherein
a plurality of items of the exercise equipment are juxtaposed in a lateral direction,
the adjacent two exercise equipment items share the second wall, and
both surfaces of the second wall form respective portions of the screens of the two exercise equipment items.

10. The exercise equipment according to claim 1, wherein
the exercise device transmits, to the video device, notification information based on a state of the user and/or a state of the exercise device, and
the video device controls the display video based on the notification information.

11. The exercise equipment according to claim 2, wherein
the video device has a viewing surface including a front side of the user and surrounding at least a part of a periphery of the user and is configured to follow movement of the viewpoint position to generate the display video which simulates how the plurality of objects appear when the plurality of objects are viewed via the viewing surface and display the display video on the viewing surface.

12. The exercise equipment according to claim 11, wherein
the viewing surface includes local viewing surfaces on a plurality of planes having a predetermined angle formed therebetween, and
the video device is configured to follow the movement of the viewpoint position to generate, for each of the plurality of planes, the display video which simulates how the plurality of objects appear when the plurality of objects are viewed via the local viewing surface on the plane and display the display video on each of the local viewing surfaces on the planes.

13. The exercise equipment according to claim 11, wherein
the viewing surface includes a curved viewing surface corresponding to at least a part of a circumferentially extending inner surface of a cylindrical shape surrounding at least a head region of the user, and
the video device is configured to follow the movement of the viewpoint position to generate the display video which simulates how the plurality of objects appear when the plurality of objects are viewed via each of portions of the curved viewing surface and display the display video on each of the portions of the curved viewing surface.

14. The exercise equipment according to claim 11, wherein
the viewing surface includes a curved viewing surface corresponding to a part of an inner surface of a spherical shape surrounding at least a head region of the user, and
the video device is configured to follow the movement of the viewpoint position to generate the display video which simulates how the plurality of objects appear when the plurality of objects are viewed via each of portions of the curved viewing surface and display the display video on each of the portions of the curved viewing surface.

15. The exercise equipment according to claim 1, wherein the video device changes display on the viewing surface in response to movement of the viewpoint position out of a predetermined range.

16. The exercise equipment according to claim 1, wherein the video device includes:
a display device configured to display the display video on the viewing surface; and
a three-dimensional eyeglass device configured to be worn by the user,
the display device is configured to generate, based on the viewpoint position, two display videos for left and right eyes having a disparity therebetween and display the two display videos on the viewing surface, and
the three-dimensional eyeglass device is configured to respectively show the two display videos to the left and right eyes of the user.

17. The exercise equipment according to claim 1, wherein the video device is configured to receive a video signal and generate the display video based on the video signal.

* * * * *